(12) United States Patent
Sugiyama et al.

(10) Patent No.: US 8,894,213 B2
(45) Date of Patent: Nov. 25, 2014

(54) LIGHT SOURCE DEVICE AND PROJECTION DISPLAY APPARATUS

(75) Inventors: Hiroki Sugiyama, Osaka (JP); Hiroshi Kitano, Hyogo (JP)

(73) Assignee: Panasonic Corporation, Kadoma-shi (JP)

( * ) Notice: Subject to any disclaimer, the term of this patent is extended or adjusted under 35 U.S.C. 154(b) by 341 days.

(21) Appl. No.: 13/451,568

(22) Filed: Apr. 20, 2012

(65) Prior Publication Data

US 2012/0268503 A1   Oct. 25, 2012

(30) Foreign Application Priority Data

Apr. 20, 2011  (JP) ................................. 2011-093739
Apr. 12, 2012  (JP) ................................. 2012-091257

(51) Int. Cl.
*G03B 21/00* (2006.01)
*H04N 9/31* (2006.01)
*G03B 21/20* (2006.01)

(52) U.S. Cl.
CPC ............ *H04N 9/3164* (2013.01); *G03B 21/204* (2013.01); *H04N 9/3161* (2013.01); *G03B 21/2013* (2013.01)
USPC ................... 353/31; 353/34; 353/37; 353/84; 353/85; 353/98; 362/84; 362/231

(58) Field of Classification Search
CPC ...... G02B 3/0056; G02B 3/0087; H04N 9/31; H04N 9/3129; H04N 9/3161; H04N 9/3197; G03B 21/2013; G03B 21/204
USPC ........... 353/31, 34, 37, 38, 84, 85, 97, 98, 99, 353/102; 362/84, 231, 259, 293, 296.01, 362/551; 349/5, 7–9
See application file for complete search history.

(56) References Cited

U.S. PATENT DOCUMENTS

| | | | | |
|---|---|---|---|---|
| 5,315,418 | A * | 5/1994 | Sprague et al. ................ | 349/112 |
| 8,427,590 | B2 * | 4/2013 | Raring et al. .................. | 348/744 |
| 2010/0328554 | A1 * | 12/2010 | Shibasaki ....................... | 348/760 |
| 2010/0328626 | A1 * | 12/2010 | Miyazaki ........................ | 353/85 |
| 2010/0328632 | A1 * | 12/2010 | Kurosaki et al. ................ | 353/98 |
| 2012/0230013 | A1 * | 9/2012 | Xu .................................. | 362/84 |
| 2013/0222772 | A1 * | 8/2013 | Matsubara ...................... | 353/31 |

FOREIGN PATENT DOCUMENTS

JP        2011-013320 A      1/2011

* cited by examiner

*Primary Examiner* — Sultan Chowdhury
(74) *Attorney, Agent, or Firm* — James W. Judge

(57) ABSTRACT

A solid-state light source unit emits excitation light. Fluorescent material layer is formed on each side of a glass substrate of a fluorescent plate so as to interpose a reflective film therebetween. The first optical system optically guides, to a rod integrator, red and blue LED light, and green fluorescence that is generated by excitation occurring when blue laser light emitted from the solid-state light source unit is applied to the fluorescent material layer on one surface of the fluorescent plate, and that is emitted in the −X direction. The second optical system optically guides, to the rod integrator, red and blue LED light, and green fluorescence that is generated by excitation occurring when blue laser light emitted from the solid-state light source unit is applied to the fluorescent material layer on the other surface of the fluorescent plate, and that is emitted in the +X direction.

20 Claims, 14 Drawing Sheets

LIGHT SOURCE DEVICE AND PROJECTION DISPLAY APPARATUS

BACKGROUND OF THE INVENTION

1. Field of the Invention

The present invention relates to projection display apparatuses that with illumination light illuminate images formed on light valves and that by means of projection lenses enlarge and project the images on a screen, and relates to light source devices used in such projection display apparatuses.

2. Description of the Background Art

Discharge lamps are widely employed as light sources for projection display apparatuses using liquid-crystal or minor-deflection type digital micromirror devices (DMDs) for light valves. Discharge lamps, however, carry with them problems of short lifespan and poor reliability.

In order to solve these problems, projection display apparatuses that use, as the light sources, solid-state light sources such as semiconductor lasers or light emitting diodes (LEDs) have been suggested.

However, with projection display apparatuses using trichromatic red, green and blue laser light sources, there are image quality problems in that speckles stand out, especially in green light. Further, with light sources using trichromatic red, green and blue LEDs the light emitting efficiency, especially of the green LEDs, is poor, such that improving projection display apparatus brightness has been an issue.

Therefore, as a separate technique for enhancing brightness in projection display apparatuses using solid-state light sources, a light source device in which a number of different types of solid-state light sources are combined with a fluorescent material that fluoresces on being excited by light from the solid-state light sources has been suggested.

In implementations utilizing a configuration in which blue light is obtained from a laser light source, red light is obtained from an LED, and green light is obtained by exciting a fluorescent material by utilizing the laser light source used for the blue light, insufficiency in the amount of green light can be overcome. Green light insufficiency is a problem with illumination devices using green LED light sources or green laser light sources, which are poor in light-emitting efficiency. The structure just described may therefore be advantageous.

On the other hand, in the configuration in which a blue laser light source and a green fluorescent material are combined with each other, an LED is used as a red light source. Therefore, if brightness of the illumination device is to be further enhanced, improving the red light output becomes an issue. However, while the output power of a blue laser light source and of green fluorescence from excitation using the blue laser light source are relatively easily enhanced, output power of a red LED light source is significantly difficult to improve with there being just a single one.

Further, in order to represent video images in a natural manner it is necessary that the light source employed in the illumination device include light of the three primary colors, red, blue and green. Therefore, if the output power is increased in a configuration in which blue light is obtained from a laser light source, red light is obtained from an LED, and green light is obtained by exciting a fluorescent material with blue light using the laser-light source employed, the red light will be insufficient. Consequent problems have been that the balance among red, blue and green necessary for representing white is upset, spoiling the impression of white, or otherwise that when a video image is represented, it turns out to be an image in which the red alone is dark.

Therefore, in order to enhance brightness while preserving a balance in the intensities of the red, blue and green light, each of light sources for red, for blue, and for green light presumably could be constituted from a plurality of identical light sources.

However, in conventional projection display apparatuses employing fluorescent materials, light sources of a plurality of colors being independently present means the number of parts is large. Therefore, if a conventional projection display apparatus is simply configured with a plurality of light sources for each color in order to enhance the brightness, the number of parts would be further increased.

SUMMARY OF THE INVENTION

The present invention is directed to a light source device utilizing excitation light to emit fluorescence. The light source device of the present invention includes: an excitation light source for emitting the excitation light; a fluorescent plate in which a substrate has a surface to which a fluorescent material is applied; a first optical system configured to optically guide, to a light combining section, fluorescence emitted in a first direction by the excitation light being applied to the fluorescent material; and a second optical system configured to optically guide, to the light combining section, fluorescence emitted in a second direction by the excitation light being applied to the fluorescent material.

Further, a projection display apparatus can be structured so as to include the light source device; an image display device, on which light outputted from the light source device is incident, configured to modulate the incident light according to a video signal; and a projection lens configured to project, on a screen, light obtained by the modulation in the image display device.

In the light source device, the excitation light source includes a first light source and a second light source, and the first direction in which the fluorescence is emitted by the first optical system is a direction in which light is reflected as the fluorescence by the excitation light emitted from the first light source being incident, and the second direction in which the fluorescence is emitted by the second optical system is a direction in which light is reflected as the fluorescence by the excitation light emitted from the second light source being incident.

Specifically, the fluorescent plate includes: the substrate; a reflective film formed on both surfaces of the substrate; and the fluorescent material applied to the reflective film, and the first light source and the second light source apply the excitation light to the fluorescent material on different surfaces, respectively, of the fluorescent plate. In this case, it is preferable that an axis of the fluorescence in the first direction and an axis of the fluorescence in the second direction are coincident, and the first optical system and the second optical system are positioned so as to be almost symmetric about the fluorescent plate. Alternatively, it is preferable that a position at which the excitation light is applied to the fluorescent material for emitting the fluorescence in the first direction is different from a position at which the excitation light is applied to the fluorescent material for emitting the fluorescence in the second direction, and an axis of the fluorescence in the first direction and an axis of the fluorescence in the second direction do not coincide.

Alternatively, the fluorescent plate includes: the substrate; a reflective film formed on one surface of the substrate; and the fluorescent material applied to the reflective film, and the first light source and the second light source each apply the excitation light to the fluorescent plate on a same single surface of the fluorescent plate. In this case, it is preferable that the first direction and the second direction are parallel to each other, and the first optical system and the second optical system are positioned so as to be almost symmetric about the fluorescent plate.

Alternatively, the fluorescent plate includes: a transparent substrate; and the fluorescent material applied to one surface of the transparent substrate, and the first light source and the second light source apply the excitation light to the fluorescent material on different surfaces, respectively, of the fluorescent plate. In this case, it is preferable that an axis of the fluorescence in the first direction and an axis of the fluorescence in the second direction are coincident, and the first optical system and the second optical system are positioned so as to be almost symmetric about the fluorescent plate.

Further, in the light source device, the first direction in which the fluorescence is emitted by the first optical system is a direction in which light is reflected as the fluorescence by the excitation light emitted from the excitation light source being incident, and the second direction in which the fluorescence is emitted by the second optical system is a direction in which the excitation light that is emitted from the excitation light source and is incident is transmitted Specifically, the fluorescent plate includes: a transparent substrate; and the fluorescent material applied to at least a portion of one surface of the transparent substrate, and the excitation light source applies the excitation light to one surface of the fluorescent plate. In this case, it is preferable that the first optical system and the second optical system are positioned so as to be almost symmetric about the fluorescent plate.

Further, in the light source device, the excitation light source may include a first light source and a second light source, and the first direction in which the fluorescence is emitted in the first optical system is a direction in which the excitation light that is emitted from the first light source and is incident is transmitted, and the second direction in which the fluorescence is emitted in the second optical system is a direction in which the excitation light that is emitted from the second light source and is incident is transmitted. In this case, it is preferable that the first direction and the second direction are parallel to each other, and the first optical system and the second optical system are positioned so as to be almost symmetric about the fluorescent plate.

It is preferable that an optical distance of the first optical system and an optical distance of the second optical system are almost equal to each other. Further, it is preferable that the excitation light source includes a plurality of semiconductor lasers. Moreover, it is preferable that the fluorescence emitted from the fluorescent material in the first direction and the fluorescence emitted from the fluorescent material in the second direction have almost the same fluorescence spectrum.

Furthermore, each of the first optical system and the second optical system may include at least one additional light source that emits colored light in a wavelength band that is different from a main wavelength band of the fluorescence emitted from the fluorescent material. In this case, a light intensity of the fluorescence emitted from the fluorescent plate and a light intensity of the colored light emitted from the at least one additional light source may be equal to each other. Typically, the colored light of the at least one additional light source is combined with the fluorescence emitted from the fluorescent plate to generate white light.

DESCRIPTION OF THE PREFERRED EMBODIMENTS

Hereinafter, embodiments for carrying out the present invention will be described with reference to the drawings.

First Embodiment

Figure 1A:
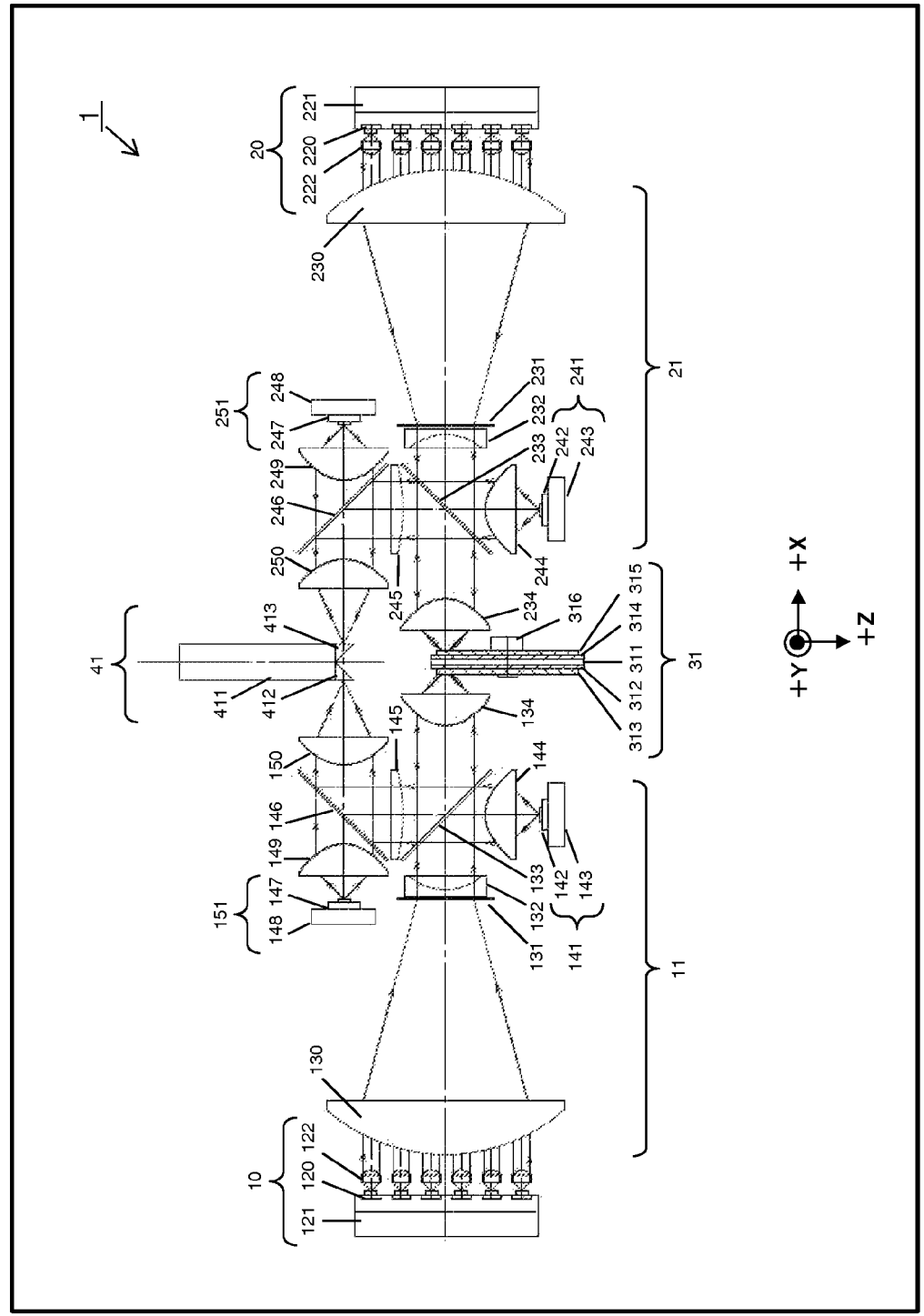
FIG. 1A illustrates a structure of a light source device 1 according to a first embodiment of the present invention.

FIG. 1A illustrates a structure of a light source device 1 according to a first embodiment of the present invention. In FIG. 1A, the light source device 1 according to the first embodiment includes a solid-state light source unit 10 and a solid-state light source unit 20, a first optical system 11, a second optical system 21, a fluorescent plate 31, and a light combining section 41.

Figure 2A:
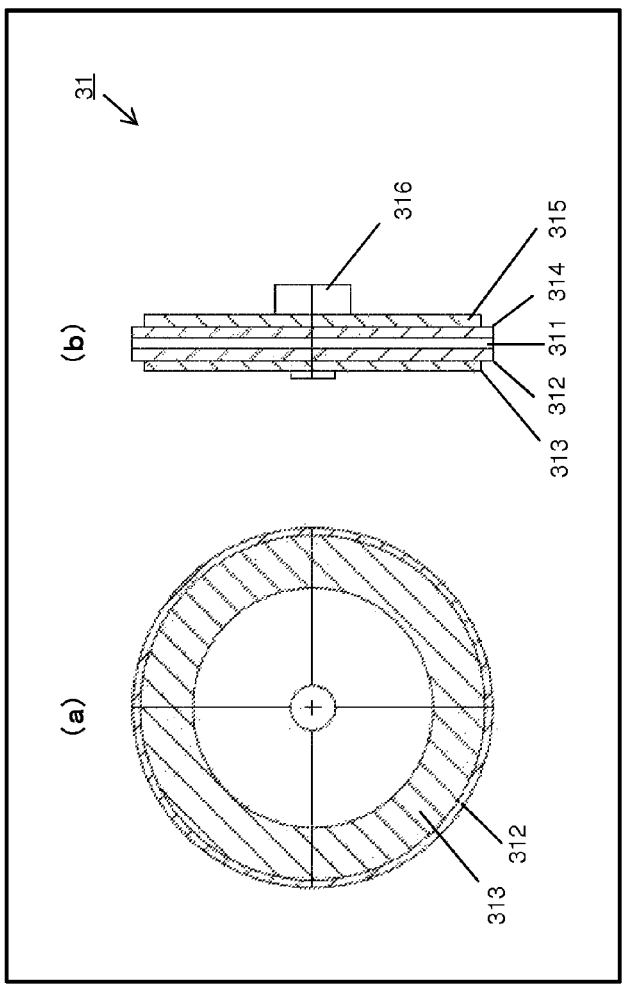
FIG. 2A illustrates a structure of a fluorescent plate 31 according to the first embodiment of the present invention.
Figure 2B:
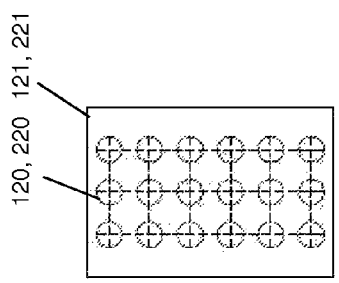
FIG. 2B illustrates structures of solid-state light source units 10 and 20 shown in FIG. 1.

FIG. 2A illustrates in detail an exemplary structure of the fluorescent plate 31 shown in FIG. 1A. In FIG. 2A, (a) represents a front view of the fluorescent plate 31, and (b) represents a side view of the fluorescent plate 31. FIG. 2B illustrates an exemplary positioning of each of a blue semiconductor laser 120 and a blue semiconductor laser 220 shown in FIG. 1A.

Firstly, structures of components of the light source device 1 according to the first embodiment will be described.
[Structure of Fluorescent Plate 31]

The fluorescent plate 31 includes a glass substrate 311, a reflective film 312 and a reflective film 314, a fluorescent material layer 313 and a fluorescent material layer 315, and a motor 316.

The glass substrate 311 is a circular substrate formed of a transparent glass. In the first embodiment and a second embodiment described below, a substrate formed of a material other than a glass, such as a metal substrate, may be used instead of the glass substrate 311 when the material other than a glass is excellent in heat releasing property. The motor 316 is provided at the center portion of the glass substrate 311, and controls rotation about a rotation axis corresponding to the center of the glass substrate 311. The reflective film 312 is formed on one (hereinafter, referred to as a first surface) of the surfaces of the glass substrate 311, and the fluorescent material layer 313 is formed in an annular shape on the reflective film 312. Similarly, the reflective film 314 is formed on the other (hereinafter, referred to as a second surface) of the surfaces of the glass substrate 311, and the fluorescent material layer 315 is formed in an annular shape on the reflective film 314. The reflective films 312 and 314 are each a dielectric thin film that reflects a visible light such as fluorescence. The fluorescent material layers 313 and 315 each include a fluorescent material that is excited by blue excitation light for emitting green fluorescence. The fluorescent plate 31, which is caused to rotate by the motor 316, can restrain increase in temperature of the fluorescent material due to the excitation light, and can stabilize an efficiency of converting into fluorescence by the excitation light.

[Structures of Solid-State Light Source Units 10 and 20]

The solid-state light source unit 10 includes a plurality of blue semiconductor lasers 120, a heat releasing plate 121, and a plurality of collimator lenses 122. The solid-state light source unit 20 includes a plurality of blue semiconductor lasers 220, a heat releasing plate 221, and a plurality of collimator lenses 222. The solid-state light source unit 10 and the solid-state light source unit 20 have the same structure, and function as excitation light sources.

The plurality of blue semiconductor lasers 120 are two-dimensionally positioned on the heat releasing plate 121 at regular intervals, and each emit blue laser light. The plurality of blue semiconductor lasers 220 are two-dimensionally positioned on the heat releasing plate 221 at regular intervals, and each emit blue laser light. In the present embodiment, the number of the blue semiconductor lasers 120 and the number of the blue semiconductor lasers 220 are each 18, and the blue semiconductor lasers 120 are positioned on the heat releasing plate 121 so as to satisfy 6 lines×3 rows, and the blue semiconductor lasers 220 are positioned on the heat releasing plate 221 so as to satisfy 6 lines×3 rows (see FIG. 2B). The heat releasing plates 121 and 221 are used for releasing heat generated from the plurality of blue semiconductor lasers 120 and 220 to cool the solid-state light source units 10 and 20, respectively. The plurality of collimator lenses 122 are provided so as to correspond to the plurality of blue semiconductor lasers 120, respectively, and convert laser light emitted from the plurality of blue semiconductor lasers 120 into parallel rays. On the other hand, the plurality of collimator lenses 222 are provided so as to correspond to the plurality of blue semiconductor lasers 220, respectively, and convert laser light emitted from the plurality of blue semiconductor lasers 220 into parallel rays.

The solid-state light source unit 10 is provided at such a position that a light axis of laser light emitted from the plurality of collimator lenses 122 is approximately orthogonal to the first surface on which the fluorescent material layer 313 of the fluorescent plate 31 is formed. On the other hand, the solid-state light source unit 20 is provided at such a position that a light axis of laser light emitted from the plurality of collimator lenses 222 is approximately orthogonal to the second surface on which the fluorescent material layer 315 of the fluorescent plate 31 is formed.

[Structure of First Optical System 11]

The first optical system 11 includes a convex lens 130, a diffuser plate 131, a concave lens 132, a blue light transmission dichroic mirror 133, a red light transmission dichroic mirror 146, condenser lenses 134, 144, 149, and 150, a relay lens 145, a blue light source 141, and a red light source 151.

The blue light source 141 includes a blue LED 142 and a heat releasing plate 143. The blue LED 142 is provided on the heat releasing plate 143 for releasing heat, and emits blue LED light in a wavelength band different from a main wavelength band of green fluorescence. The blue light source 141 is provided at such a position that a light axis of the emitted LED light is orthogonal to a light axis of a flux of laser light emitted from the solid-state light source unit 10.

The red light source 151 includes a red LED 147 and a heat releasing plate 148. The red LED 147 is provided on the heat releasing plate 148 for releasing heat, and emits red LED light in a wavelength band different from the main wavelength band of the green fluorescence. The red light source 151 is provided at such a position that a light axis of the emitted LED light is parallel to the light axis of the flux of the laser light emitted from the solid-state light source unit 10.

The convex lens 130, the diffuser plate 131, the concave lens 132, the blue light transmission dichroic minor 133, and the condenser lens 134 are positioned between the solid-state light source unit 10 and the fluorescent plate 31. The convex lens 130 collects incident light. The diffuser plate 131 is a glass substrate having a minutely uneven surface, and diffuses incident light. The concave lens 132 converts incident light into almost parallel rays and emits the parallel rays. The blue light transmission dichroic minor 133 is formed as a dielectric multilayer film that has its minor surface tilted relative to the light axis of the flux of the laser light by about 45 degrees. The blue light transmission dichroic minor 133 transmits blue laser light and blue LED light therethrough, and reflects green fluorescence. The condenser lens 134 converts parallel rays into a point of light or a point of light into parallel rays.

The condenser lens 144 is positioned between the blue light source 141 and the blue light transmission dichroic mirror 133, and converts incident light into parallel rays. The condenser lens 149, the red light transmission dichroic mirror 146, and the condenser lens 150 are positioned between the red light source 151 and the light combining section 41. The condenser lens 149 converts incident light into parallel rays. The red light transmission dichroic mirror 146 is formed as a dielectric multilayer film that has its minor surface tilted relative to the mirror surface of the blue light transmission dichroic mirror 133 by about 90 degrees. The red light transmission dichroic minor 146 transmits red LED light therethrough, and reflects blue LED light and green fluorescence. The condenser lens 150 converts parallel rays into a point of light. The relay lens 145 is positioned between the blue light transmission dichroic mirror 133 and the red light transmission dichroic mirror 146 so as to maintain a state of the parallel rays.

[Structure of Second Optical System 21]

The second optical system 21 includes a convex lens 230, a diffuser plate 231, a concave lens 232, a blue light transmission dichroic mirror 233, a red light transmission dichroic minor 246, condenser lens 234, 244, 249, and 250, a relay lens 245, a blue light source 241, and a red light source 251.

The second optical system 21 has a structure identical to that of the first optical system 11 described above except that the components of the first optical system 11 and the components of the second optical system 21 are positioned so as to be bilaterally symmetric about the fluorescent plate 31. Namely, the light axis of the blue laser light emitted from the solid-state light source unit 10 and the light axis of the blue laser light emitted from the solid-state light source unit 20 are coincident. In each of the embodiments described below, since the difference between the second optical system 21 and the first optical system 11 is such that the first optical system 11 and the second optical system 21 are bilaterally symmetric, the same components as those of the first optical system 11 are denoted by changing only a hundreds place in each of the reference numerals of the components of the first optical system 11 from "1" to "2" for the second optical system 21, and description for the same components is not repeated.

[Structure of Light Combining Section 41]

The light combining section 41 includes a rod integrator 411 and combining prisms 412 and 413.

The combining prisms 412 and 413 each have a reflective coating formed on a sloped surface thereof. The combining prisms 412 and 413 are formed on one end of the rod integrator 411 so as to be bilaterally symmetric. The combining prism 412 optically guides the point of light emitted from the condenser lens 150 of the first optical system 11 into the rod integrator 411, and the combining prism 413 optically guides the point of light emitted from the condenser lens 250 of the second optical system 21 into the rod integrator 411.

[Operation Performed by Light Source Device 1]

Next, an operation performed by the light source device 1 according to the first embodiment will be described.

The blue laser light (excitation light) emitted from the solid-state light source unit 10 is collected by the convex lens 130, is converted into almost parallel rays while being transmitted through the diffuser plate 131 and the concave lens 132, and is incident on the blue light transmission dichroic minor 133. Since the blue light transmission dichroic minor 133 transmits blue laser light therethrough, the blue laser light is collected by the condenser lens 134, and spot-applied to the first surface on which the fluorescent material layer 313 of the fluorescent plate 31 is formed (the +X direction shown in FIG. 1A).

On the other hand, the blue laser light (excitation light) emitted from the solid-state light source unit 20 is collected by the convex lens 230, is converted into almost parallel rays while being transmitted through the diffuser plate 231 and the concave lens 232, and is incident on the blue light transmission dichroic minor 233. The blue laser light is transmitted through the blue light transmission dichroic mirror 233, collected by the condenser lens 234, and spot-applied to the second surface on which the fluorescent material layer 315 of the fluorescent plate 31 is formed (the –X direction shown in FIG. 1A).

The blue laser light applied to the fluorescent material layer 313 is wavelength-transformed by a green fluorescent material contained in the fluorescent material layer 313, to generate green fluorescence. The reflective film 312 is formed on the first surface of the glass substrate 311 of the fluorescent plate 31. Therefore, the generated green fluorescence is collected on the condenser lens 134 side (the –X direction shown in FIG. 1A), and emitted.

On the other hand, the blue laser light applied to the fluorescent material layer 315 is wavelength-transformed by a green fluorescent material contained in the fluorescent material layer 315, to generate green fluorescence. The reflective film 314 is formed on the second surface of the glass substrate 311 of the fluorescent plate 31. Therefore, the generated green fluorescence is collected on the condenser lens 234 side (the +X direction shown in FIG. 1A), and emitted.

The green fluorescence emitted from the first surface of the fluorescent plate 31 in the –X direction is converted into almost parallel rays by the condenser lens 134, and is incident on the blue light transmission dichroic minor 133. Since the blue light transmission dichroic mirror 133 reflects green fluorescence, a light path of the green fluorescence is turned 90 degrees, and the green fluorescence is incident on the red light transmission dichroic minor 146. Further, since the blue light transmission dichroic minor 133 transmits blue LED light therethrough, the blue LED light emitted from the blue light source 141 is transmitted through the relay lens 145, and is incident on the red light transmission dichroic minor 146.

Thus, in the first optical system 11, the green fluorescence and the blue LED light are combined with each other on the same light axis.

On the other hand, the green fluorescence emitted from the second surface of the fluorescent plate 31 in the +X direction is converted into almost parallel rays by the condenser lens 234, and is incident on the blue light transmission dichroic minor 233. The green fluorescence is reflected by the blue light transmission dichroic mirror 233, and a light path of the green fluorescence is turned 90 degrees, and the green fluorescence is incident on the red light transmission dichroic minor 246. Further, since the blue light transmission dichroic mirror 233 transmits blue LED light therethrough, the blue LED light emitted from the blue light source 241 is transmitted through the relay lens 245, and is incident on the red light transmission dichroic mirror 246.

Thus, in the second optical system 21, the green fluorescence and the blue LED light are combined with each other on the same light axis.

It is desired that a fluorescence spectrum of the green fluorescence emitted in the –X direction from the first surface of the fluorescent plate 31 is almost equal to a fluorescence spectrum of the green fluorescence emitted in the +X direction from the second surface of the fluorescent plate 31.

Since the red light transmission dichroic mirror 146 reflects green fluorescence and blue LED light, the green fluorescence and the blue LED light emitted from the blue light transmission dichroic minor 133 each have a light path turned 90 degrees, and are incident on the condenser lens 150. Further, since the red light transmission dichroic minor 146 transmits red LED light therethrough, the red LED light emitted from the red light source 151 is incident on the condenser lens 150 through the condenser lens 149.

Thus, in the first optical system 11, the green fluorescence, the blue LED light, and the red LED light are combined with each other on the same light axis (the center of gravity and a converging angle of the light flux are the same thereamong), to generate white light. In order to obtain the white light in a balanced manner, it is desired that a light intensity is the same among the red LED light, the green fluorescence, and the blue LED light.

Similarly, since the red light transmission dichroic minor 246 reflects green fluorescence and blue LED light, the green fluorescence and the blue LED light emitted from the blue light transmission dichroic minor 233 each have a light path turned 90 degrees, and are incident on the condenser lens 250. Further, since the red light transmission dichroic minor 246 transmits red LED light therethrough, the red LED light emitted from the red light source 251 is incident on the condenser lens 250 through the condenser lens 249.

Thus, in the second optical system 21, the green fluorescence, the blue LED light, and the red LED light are combined with each other on the same light axis (the center of gravity and a converging angle of the light flux are the same thereamong), to generate white light. In order to obtain the white light in a balanced manner, it is desired that a light intensity is the same among the red LED light, the green fluorescence, and the blue LED light.

The white light obtained by the combination in the first optical system 11 is optically guided through the combining prism 412 of the light combining section 41 into the rod integrator 411, and the white light obtained by the combination in the second optical system 21 is optically guided through the combining prism 413 of the light combining section 41 into the rod integrator 411, and the optically guided light is combined and integrated into white light.

As described above, in the light source device 1 according to the first embodiment of the present invention, the two optical systems laid out so as to be bilaterally symmetric about the fluorescent plate 31 are optically combined with each other by using one fluorescent plate 31 on which the fluorescent material layer having the reflective film is formed on both the surfaces thereof. Thus, the green fluorescence generated by the excitation with the use of the blue laser light, the red LED light, and the blue LED light, which are generated in the two optical systems, can be collected and combined with each other with an enhanced efficiency. Therefore, the white light that is favorably balanced and has a high brightness can be emitted with an enhanced efficiency.

In particular, since two optical systems are laid out bilaterally to the fluorescent plate 31, the light source device 1 of the first embodiment is advantageous in the following points. That is, a reflection that enables an efficiency of extracting the fluorescence from the fluorescent material to be enhanced, can be realized, the excitation light can be separately applied to both surfaces of the fluorescent plate 31, to minimize increase in temperate of the fluorescent material due to the excitation light, and the dimension of the light source device 1 in the Y direction can be reduced.

In general, the same type of fluorescence having the same wavelength is emitted from the fluorescent materials used for the fluorescent material layer 313 and the fluorescent material layer 315. However, the fluorescent materials that emit fluorescence having wavelengths different from each other may be used to adjust an emission color.

Further, it is preferable that a length (optical distance) of the light path from the light source to the rod integrator 411 of the first optical system 11 and a length (optical distance) of the light path from the light source to the rod integrator 411 of the second optical system 21 are equal to each other for the same color. Namely, the length of the light path of the blue light is the same between in the first optical system 11 and in the second optical system 21, and the length of the light path of the green fluorescence is the same between in the first optical system 11 and in the second optical system 21, and the length of the light path of the red light is the same between in the first optical system 11 and in the second optical system 21.

Further, in the present embodiment, the light combining section 41 that uses the rod integrator 411 and the combining prisms 412 and 413 is illustrated as a section for obtaining the white light by combination. However, various structures such as a structure in which a lens array is used, or a structure in which light from different angles are combined with each other, may be used as the section for obtaining the white light by combination.

Modification of First Embodiment

Figure 1B:
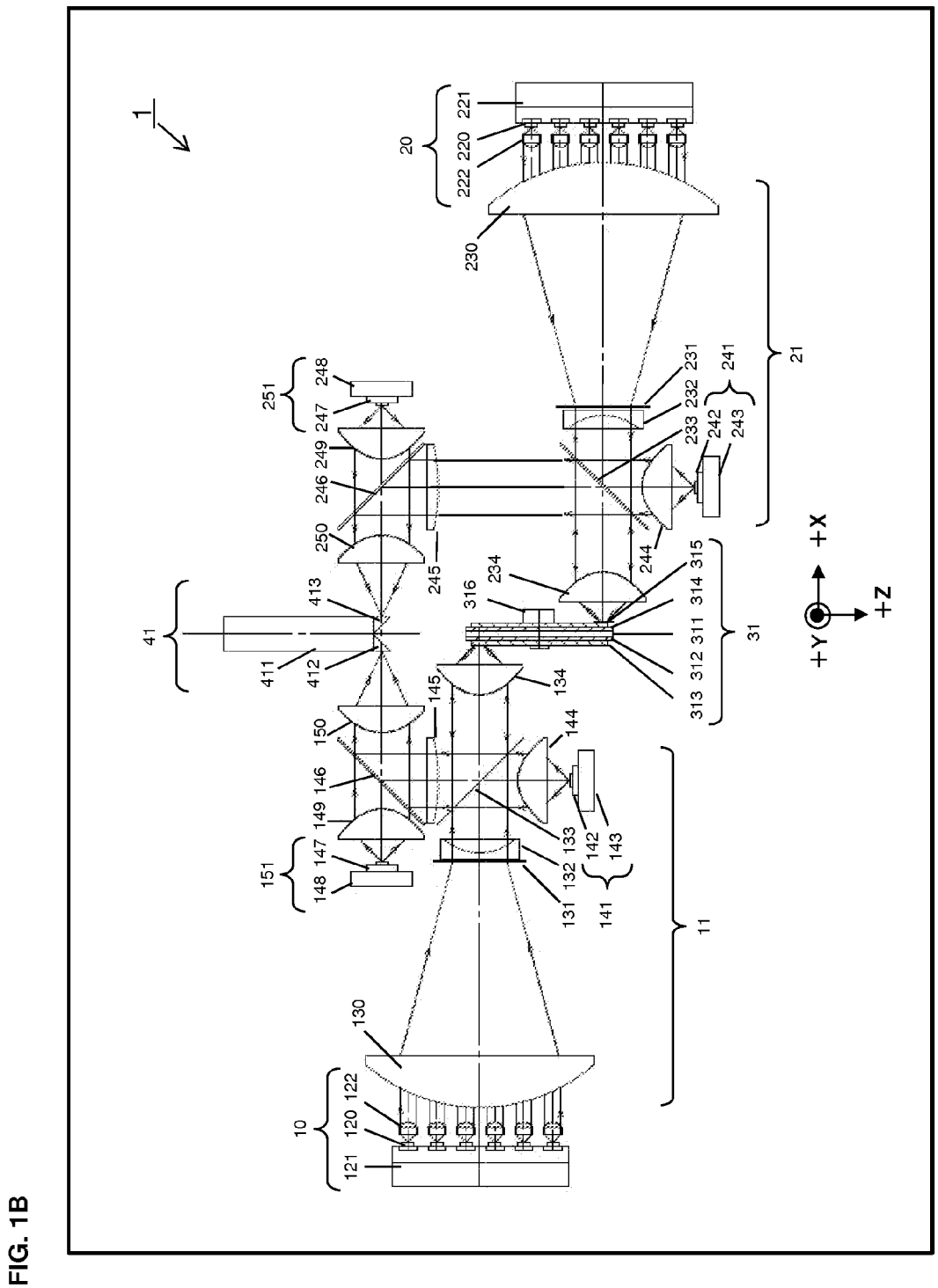
FIG. 1B illustrates a structure of an exemplary modification of the light source device 1 according to the first embodiment.

FIG. 1B illustrates an exemplary modification of the light source device 1 according to the first embodiment. The same components as those shown in FIG. 1A are denoted by the same corresponding reference numerals. The excitation light from the solid-state light source unit 20 is collected by the condenser lens 234, and spot-applied to the second surface on which the fluorescent material layer 315 of the fluorescent plate 31 is formed. However, the modification of the first embodiment is different from the first embodiment in a spot-applied position on the second surface. Specifically, the spot-applied position on the second surface is a position obtained by turning 180 degrees a position at which the excitation light collected by the condenser lens 134 are spot-applied to the first surface on which the fluorescent material layer 313 of the fluorescent plate 31 is formed. The solid-state light source unit 20, the second optical system 21, and the condenser lens 234 are positioned such that an angle between the spot-applied position on the first surface and the spot-applied position on the second surface is 180 degrees. In this case, an axis in a direction in which light of the fluorescent material obtained by applying the excitation light through the condenser lens 134 is emitted and an axis in a direction in which light of the fluorescent material obtained by applying the excitation light through the condenser lens 234 is emitted are not coincident, and are parallel to each other.

In general, increase in temperature of the fluorescent material deteriorates the converting efficiency. However, when a position at which the excitation light is applied is different between on the first surface and on the second surface of the fluorescent plate 31 as in the modification, the increase in temperature of the fluorescent material can be restrained, to enhance the converting efficiency.

Second Embodiment

Figure 3:
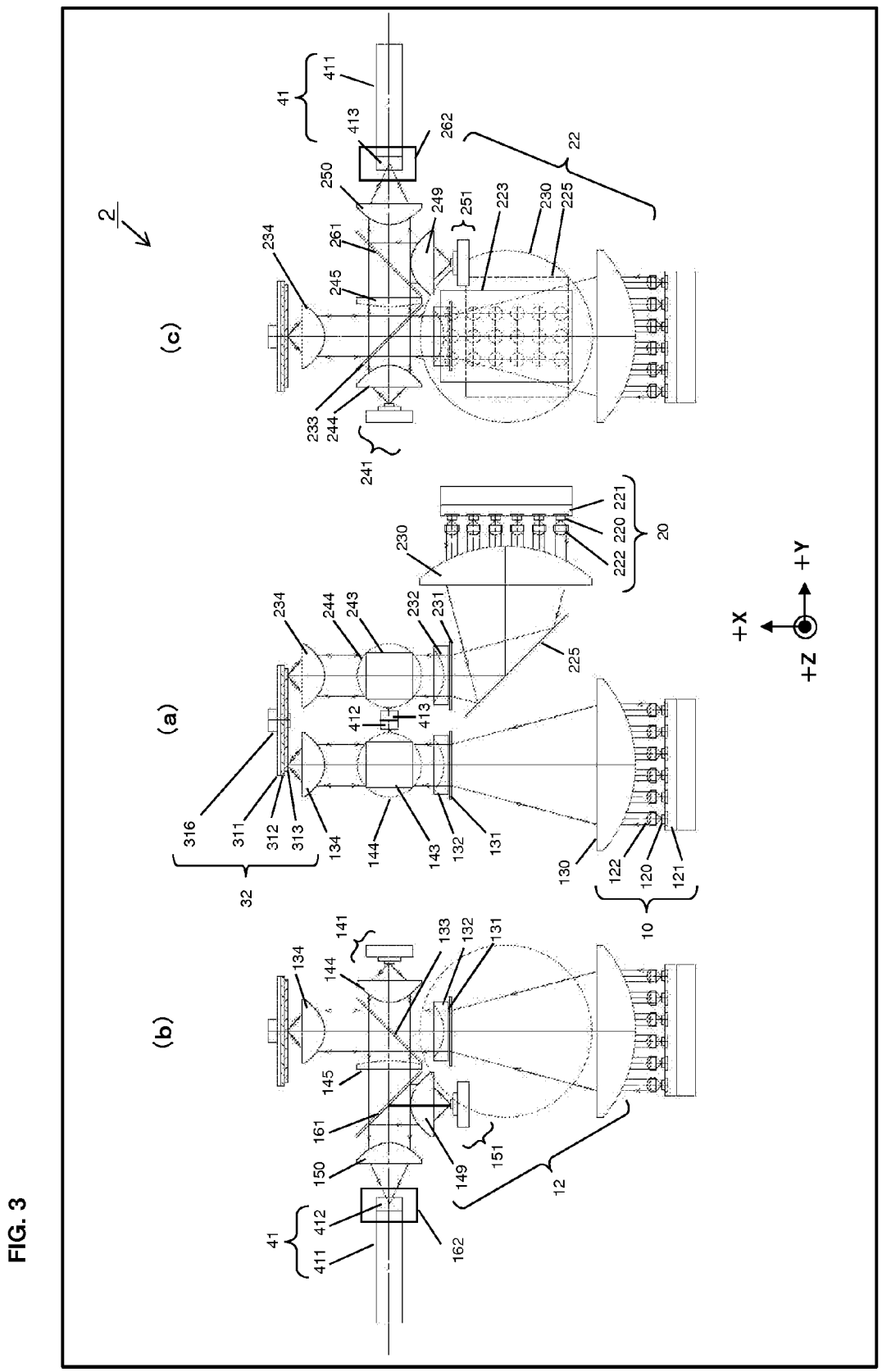
FIG. 3 illustrates a structure of a light source device 2 according to a second embodiment of the present invention.

FIG. 3 illustrates a structure of a light source device 2 according to a second embodiment of the present invention. In FIG. 3, (a) represents a front view of the light source device 2, (b) represents a left side view of the light source device 2, and (c) represents a right side view of the light source device 2. The light source device 2, shown in FIG. 3, according to the second embodiment includes the solid-state light source units 10 and 20, a first optical system 12, a second optical system 22, a fluorescent plate 32, and the light combining section 41.

Figure 4:
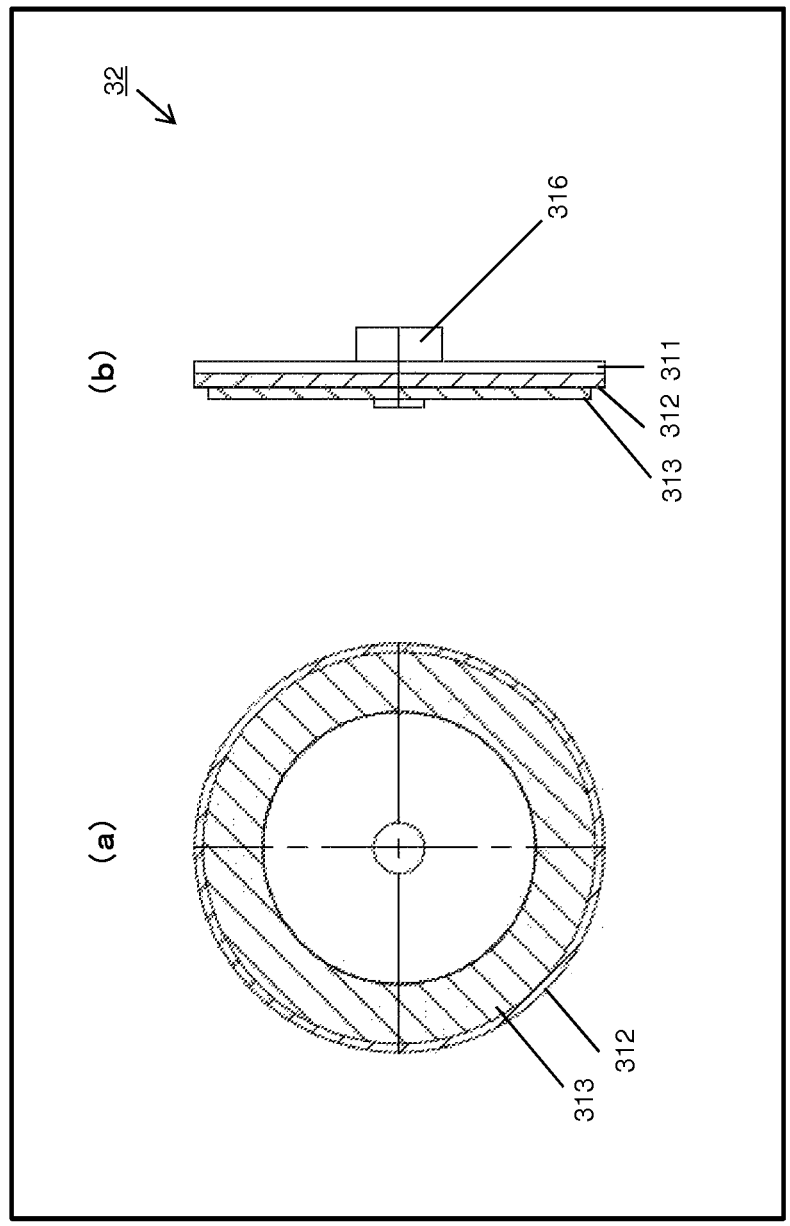
FIG. 4 illustrates a structure of a fluorescent plate 32 according to the second embodiment of the present invention.

FIG. 4 illustrates in detail an exemplary structure of the fluorescent plate 32, and (a) represents a front view thereof and (b) represents a side view thereof.

As shown in FIG. 3, the light source device 2 according to the second embodiment is different from the light source device 1 according to the first embodiment in that the light source device 2 includes the first optical system 12, the second optical system 22, and the fluorescent plate 32. Further, due to the difference of the structures, positioning of the components of the light source device 2 is different from that of the light source device 1.

Hereinafter, the structures of the light source device 2 different from those of the light source device 1 will be described, and description for the components denoted by the same reference numerals as in the first embodiment is not repeated.

[Structure of Fluorescent Plate 32]

The fluorescent plate 32 includes the glass substrate 311, the reflective film 312, the fluorescent material layer 313, and the motor 316. Namely, as shown in FIG. 4, on the fluorescent plate 32, the reflective film 312 is formed on only one (a first surface) of the surfaces of the glass substrate 311, and the fluorescent material layer 313 is formed in an annular shape on the reflective film 312.

[Structure of First Optical System 12]

In the first optical system 12, the condenser lens 150 is positioned between the blue light source 141 and the light combining section 41. Due to this positioning, the red light reflective dichroic mirror 161 (instead of the red light transmission dichroic mirror 146) is positioned between the blue light source 141 and the condenser lens 150. The red light reflective dichroic mirror 161 is formed as a dielectric multilayer film that has its mirror surface tilted relative to the minor surface of the blue light transmission dichroic mirror 133 by about 90 degrees, that transmits blue LED light and green fluorescence therethrough, and that reflects red LED light. Further, a total reflection mirror 162 for optically guiding white light emitted from the condenser lens 150 into the combining prism 412 of the light combining section 41 is additionally provided to the first optical system 12.

[Structure of Second Optical System 22]

The second optical system 22 shown in FIG. 3 is provided with a total reflection minor 225 for applying, to the first surface of the fluorescent plate 32, laser light that is emitted from the solid-state light source unit 20 to be almost parallel to the first surface of the fluorescent plate 32 such that the laser light is applied approximately orthogonal to the first surface of the fluorescent plate 32. However, when the outer diameter of the fluorescent plate 32 is great, and the size of a housing of the light source device 2 is sufficiently great, the solid-state light source unit 20 may be set so as to be opposed to the first surface of the fluorescent plate 32 without using the total reflection mirror 225, in a similar manner to that for the first optical system 12. In either structure, in the second optical system 22, laser light emitted from the solid-state light source unit 20 is applied to a surface on which the fluorescent material layer 313 of the fluorescent plate 32 is formed so as to be shared by the first optical system 12.

Further, in the second optical system 22, the condenser lens 250 is positioned between the blue light source 241 and the light combining section 41, and the red light reflective dichroic mirror 261 (instead of the red light transmission dichroic mirror 246) is positioned between the blue light source 241 and the condenser lens 250, as in the first optical system 12. The red light reflective dichroic mirror 261 is formed as a dielectric multilayer film that has its minor surface tilted relative to the mirror surface of the blue light transmission dichroic mirror 233 by about 90 degrees, that transmits blue LED light and green fluorescence therethrough, and that reflects red LED light. Further, a total reflection mirror 262 for optically guiding white light emitted from the condenser lens 250 into the combining prism 413 of the light combining section 41 is additionally provided to the first optical system 22.

[Operation Performed by Light Source Device 2]

Blue laser light A emitted from the solid-state light source unit 10 is transmitted through the blue light transmission dichroic mirror 133, and spot-applied to a first region on a surface on which the fluorescent material layer 313 of the fluorescent plate 32 is formed (the +X direction shown in FIG. 3). Further, blue laser light B emitted from the solid-state light source unit 20 is transmitted through the blue light transmission dichroic mirror 233, and spot-applied to a second region that is different from the first region, and that is on a surface on which the fluorescent material layer 313 of the fluorescent plate 32 is formed (the +X direction shown in FIG. 3).

Green fluorescence A generated by excitation with the use of the blue laser light A is emitted in the −X direction shown in FIG. 3, and green fluorescence B generated by excitation with the use of the blue laser light B is emitted in the −X direction shown in FIG. 3. The green fluorescence A emitted from the fluorescent plate 32 is reflected by the blue light transmission dichroic mirror 133, transmitted through the red light reflective dichroic mirror 161, and is incident on the condenser lens 150. The green fluorescence A is combined with the blue LED light transmitted through the blue light transmission dichroic minor 133 and the red light reflective dichroic mirror 161, and the red LED light reflected by the red light reflective dichroic mirror 161, to obtain white light, and the white light is optically guided through the total reflection mirror 162 into the light combining section 41. On the other hand, the green fluorescence B emitted from the fluorescent plate 32 is reflected by the blue light transmission dichroic mirror 233, transmitted through the red light reflective dichroic mirror 261, and is incident on the condenser lens 250. The green fluorescence B is combined with the blue LED light transmitted through the blue light transmission dichroic minor 233 and the red light reflective dichroic mirror 261, and the red LED light reflected by the red light reflective dichroic mirror 261, to obtain white light, and the white light is optically guided through the total reflection mirror 262 into the light combining section 41.

As described above, in the light source device 2 according to the second embodiment of the present invention, two optical systems laid out so as to be parallel to the fluorescent plate 32 are optically combined with each other, by using one fluorescent plate 32 on which the fluorescent material layer having the reflective film is formed on one of the surfaces. Thus, the green fluorescence, the red LED light, and the blue LED light which are generated in the two optical systems can be collected and combined with each other with an enhanced efficiency.

In particular, since the two optical systems are laid out in a reflective manner so as to be opposed to one of the surfaces of the fluorescent plate 32, the light source device 2 of the second embodiment is advantageous in the following points. That is, a reflection that enables an efficiency of extracting the fluorescence from the fluorescent material to be enhanced, can be realized, the excitation light can be separately applied to the fluorescent plate 32, to minimize increase in temperature of the fluorescent material due to the excitation light, a light intensity can be uniform between the two optical systems, non-uniformity in brightness and color of the combined light can be easily reduced, and the dimension of the light source device 2 in the X-direction can be reduced.

Third Embodiment

Figure 5:
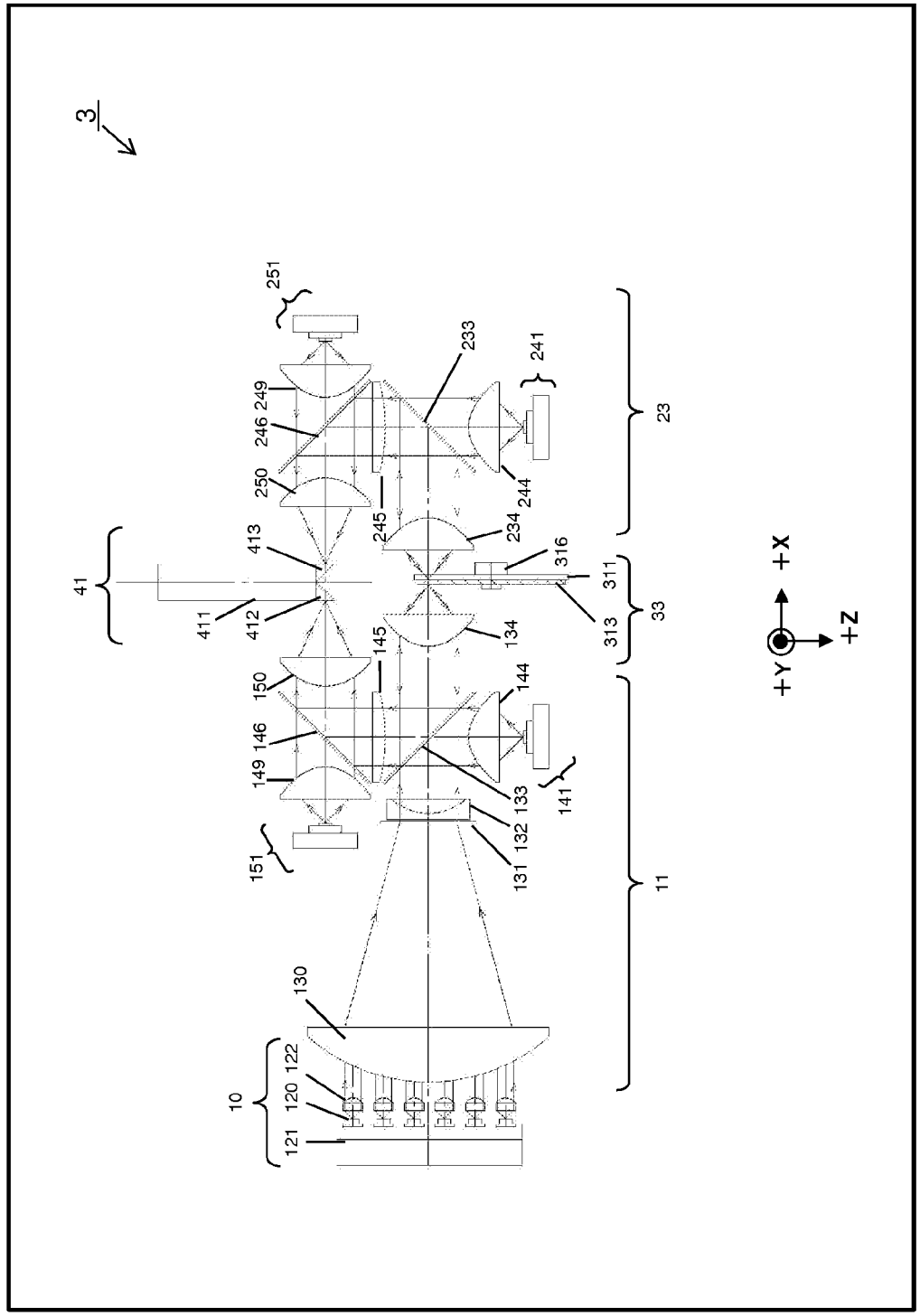
FIG. 5 illustrates a structure of a light source device 3 according to a third embodiment of the present invention.

FIG. 5 illustrates a structure of a light source device 3 according to a third embodiment of the present invention. The light source device 3, shown in FIG. 5, according to the third embodiment includes the solid-state light source unit 10, the first optical system 11, a second optical system 23, a fluorescent plate 33, and the light combining section 41.

Figure 6:
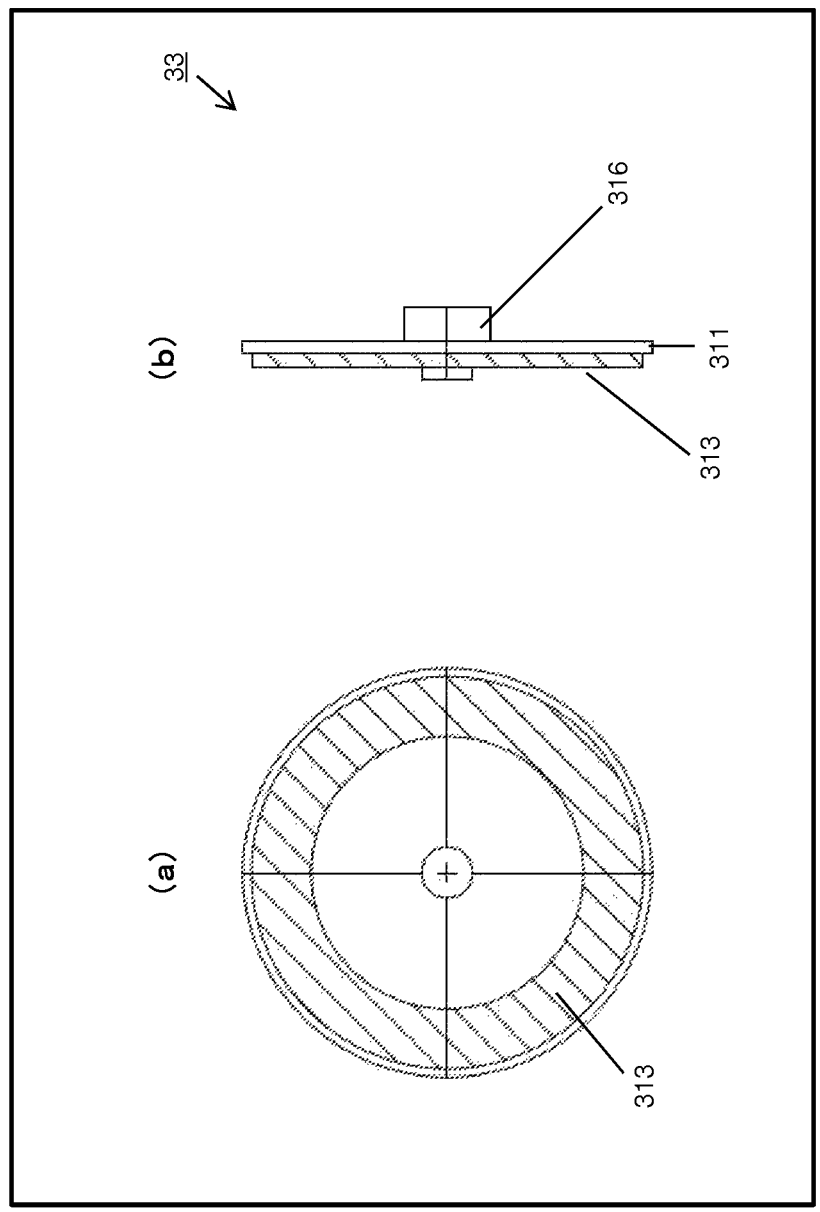
FIG. 6 illustrates a structure of a fluorescent plate 33 according to the third embodiment and a fourth embodiment of the present invention.

FIG. 6 illustrates in detail an exemplary structure of the fluorescent plate 33, and (a) represents a front view thereof and (b) represents a side view thereof.

As shown in FIG. 5, the light source device 3 of the third embodiment is the same as the light source device 1 of the first embodiment except that the light source device 3 does not include the solid-state light source unit 20, and has the second optical system 23 and the fluorescent plate 33 that have structures different from those of the light source device 1. The positioning of components of the light source device 3 is the same as that of the light source device 1.

Hereinafter, the structures of the light source device 3 different from those of the light source device 1 will be described, and description of the components denoted by the same reference numerals as in the first embodiment is not repeated.

[Structure of Fluorescent Plate 33]

The fluorescent plate 33 includes the glass substrate 311, the fluorescent material layer 313, and the motor 316. Namely, as shown in FIG. 6, on the fluorescent plate 33, the fluorescent material layer 313 is formed in an annular shape on one (a first surface) of the surfaces of the glass substrate 311. No reflective film is formed between the glass substrate 311 and the fluorescent material layer 313.

[Structure of Second Optical System 23]

The second optical system 23 shown in FIG. 5 is the same as the second optical system 21 of the first embodiment except that the second optical system 23 does not include the convex lens 230, the diffuser plate 231, and the concave lens 232. Therefore, the second optical system 23 includes no light source used for generating green fluorescence by excitation.

[Operation Performed by Light Source Device 3]

Blue laser light emitted from the solid-state light source unit 10 is transmitted through the blue light transmission dichroic mirror 133, and spot-applied to a surface on which the fluorescent material layer 313 of the fluorescent plate 33 is formed (the +X direction shown in FIG. 5). Since the fluorescent plate 33 has no reflective film between the glass substrate 311 and the fluorescent material layer 313, green fluorescence generated by excitation with the use of the blue laser light is separated and outputted bilaterally in the +X direction and the −X direction shown in FIG. 5.

The green fluorescence emitted in the −X direction from the fluorescent plate 33, is optically guided to the light combining section 41 through the light pass as described in the first embodiment. On the other hand, the green fluorescence emitted in the +X direction from the fluorescent plate 33 is converted into almost parallel rays by the condenser lens 234, then reflected by the blue light transmission dichroic minor 233, and optically guided to the light combining section 41 through the light path as described in the first embodiment.

As described above, in the light source device 3 according to the third embodiment of the present invention, the two optical systems laid out so as to be bilaterally symmetric about the fluorescent plate 33 are optically combined with each other, by using one fluorescent plate 33 on which the fluorescent material layer having no reflective film is formed. Thus, the green fluorescence, the red LED light, and the blue LED light which are generated in the two optical systems can be collected and combined with each other with an enhanced efficiency. Further, since the fluorescent plate 33 having no reflective film is used, one of the two optical systems need not include a semiconductor laser light source used for generating the green fluorescence by excitation.

In particular, it is advantageous that, since the two optical systems are laid out bilaterally to the fluorescent plate 33, the dimension of the light source device 3 in the Y-direction can be reduced.

The light source device 3 is structured such that the two blue light sources 141 and 241 for generating blue light, and the two red light sources 151 and 251 for generating red light are provided for one solid-state light source unit, that is, the solid-state light source unit 10, used for generating green light. Therefore, it is desired that the output of the solid-state light source unit 10 is doubled as compared to the output of the solid-state light source unit of the light source device 1 in order to obtain white light in a balanced manner by a light intensity being the same among the red light, the green light, and the blue light. For example, a structure in which the number of the blue semiconductor lasers 120 provided on the heat releasing plate 121 is 36 so as to satisfy 6 lines×6 rows, is suggested.

Fourth Embodiment

Figure 7:
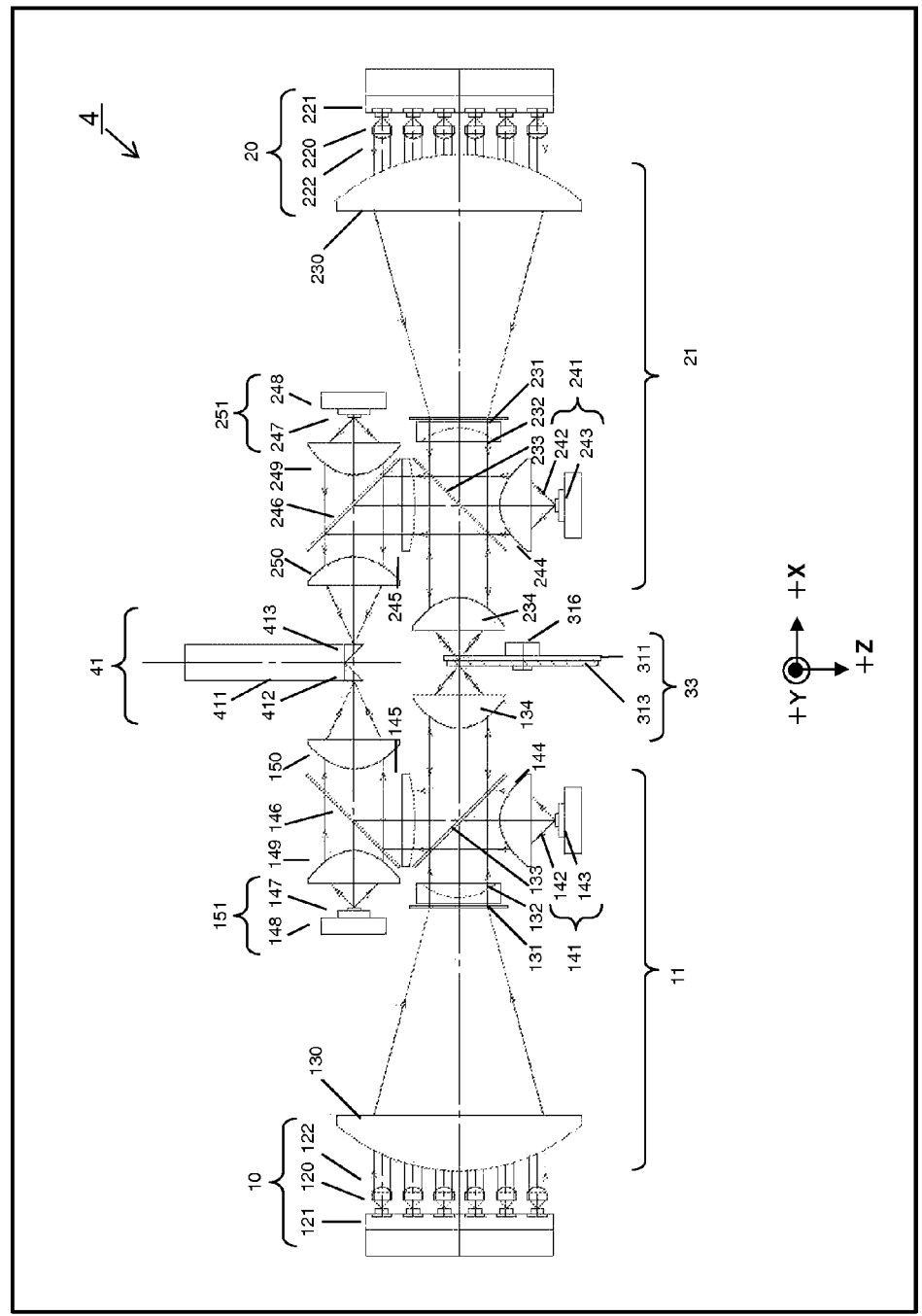
FIG. 7 illustrates a structure of a light source device 4 according to the fourth embodiment of the present invention.

FIG. 7 illustrates a structure of a light source device 4 according to a fourth embodiment of the present invention. The light source device 4, shown in FIG. 7, according to the fourth embodiment includes the solid-state light source units 10 and 20, the first optical system 11, the second optical system 21, the fluorescent plate 33, and the light combining section 41.

As shown in FIG. 7, the light source device 4 according to the fourth embodiment is different from the light source device 1 according to the first embodiment in that the light source device 4 includes the fluorescent plate 33 of the light source device 3 according to the third embodiment, instead of the fluorescent plate 31.

Hereinafter, an operation performed by the light source device 4 which is different from the operation performed by the light source device 1 will be described, and description of the same operation is not repeated.

[Operation Performed by Light Source Device 4]

Blue laser light emitted from the solid-state light source unit 10 is transmitted through the blue light transmission dichroic mirror 133, and spot-applied to the fluorescent material layer 313 of the fluorescent plate 33 (the +X direction shown in FIG. 7). Further, blue laser light emitted from the solid-state light source unit 20 is transmitted through the blue light transmission dichroic minor 233, and spot-applied to the fluorescent material layer 313 through the glass substrate 311 of the fluorescent plate 33 (the −X direction shown in FIG. 7). From the fluorescent plate 33, green fluorescence generated by excitation with the use of the blue laser light applied by both of the solid-state light source units 10 and 20 is outputted separately in the +X direction and the −X direction shown in FIG. 7.

The green fluorescence outputted in the −X direction from the fluorescent plate 33 is optically guided to the light combining section 41 through the light path described in the first embodiment. On the other hand, the green fluorescence outputted in the +X direction from the fluorescent plate 33 is converted into almost parallel rays by the condenser lens 234, reflected by the blue light transmission dichroic minor 233, and optically guided to the light combining section 41 through the light path described in the first embodiment.

As described above, in the light source device 4 according to the fourth embodiment of the present invention, the two optical systems laid out so as to be bilaterally symmetric about the fluorescent plate 33 are optically combined with each other by using one fluorescent plate 33 on which the fluorescent material layer having no reflective film is formed. Thus, the green fluorescence, the red LED light, and the blue LED light which are generated in the two optical systems can be collected and combined with each other with an enhanced efficiency.

Fifth Embodiment

Figure 8:
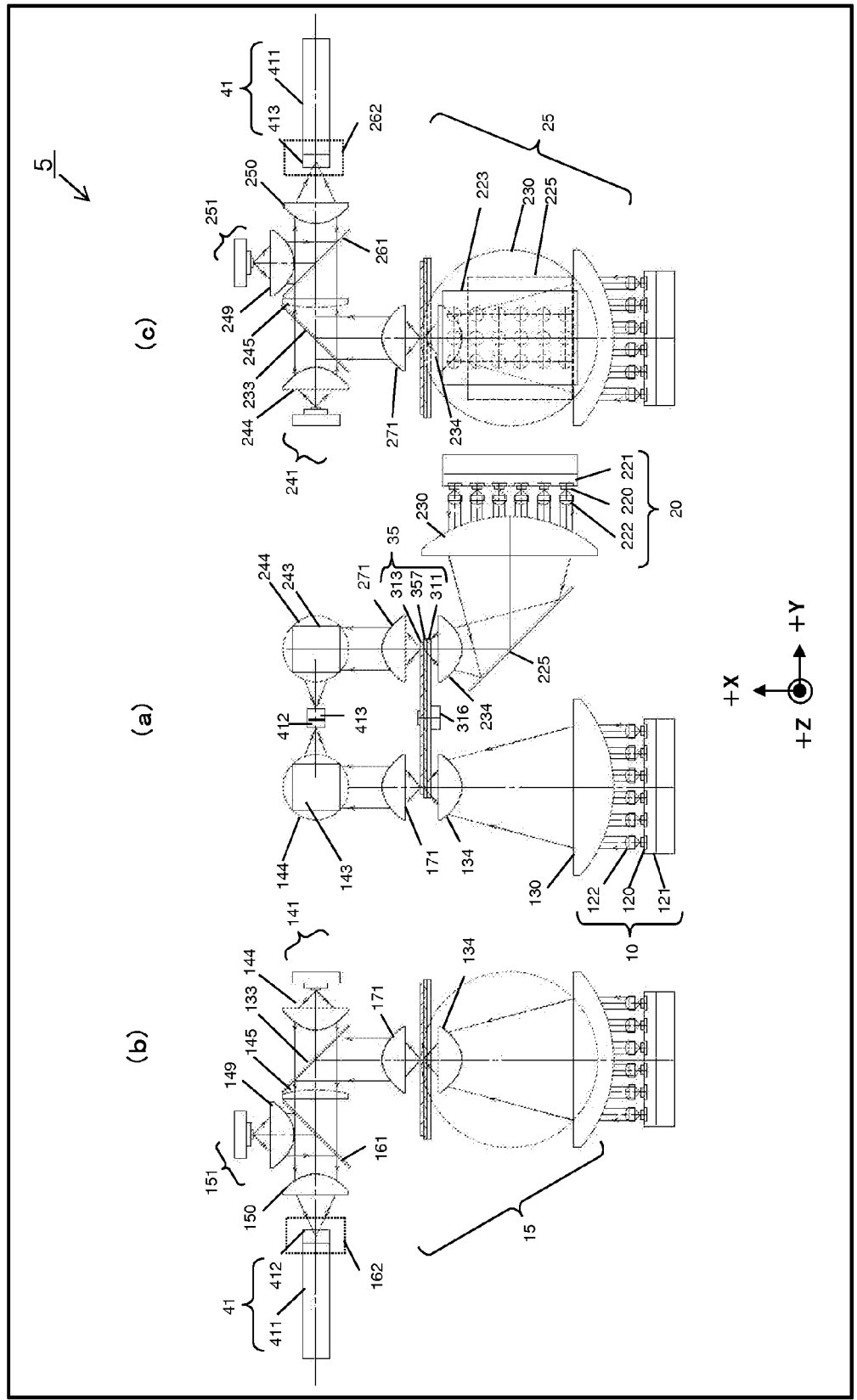
FIG. 8 illustrates a structure of a light source device 5 according to a fifth embodiment of the present invention.

FIG. 8 illustrates a structure of a light source device 5 according to a fifth embodiment of the present invention. In FIG. 8, (a) represents a front view of the light source device 5, (b) represents a left side view of the light source device 5, and (c) represents a right side view of the light source device 5. The light source device 5, as shown in FIG. 8, according to the fifth embodiment includes the solid-state light source units 10 and 20, a first optical system 15, a second optical system 25, a fluorescent plate 35, and the light combining section 41.

Figure 9:
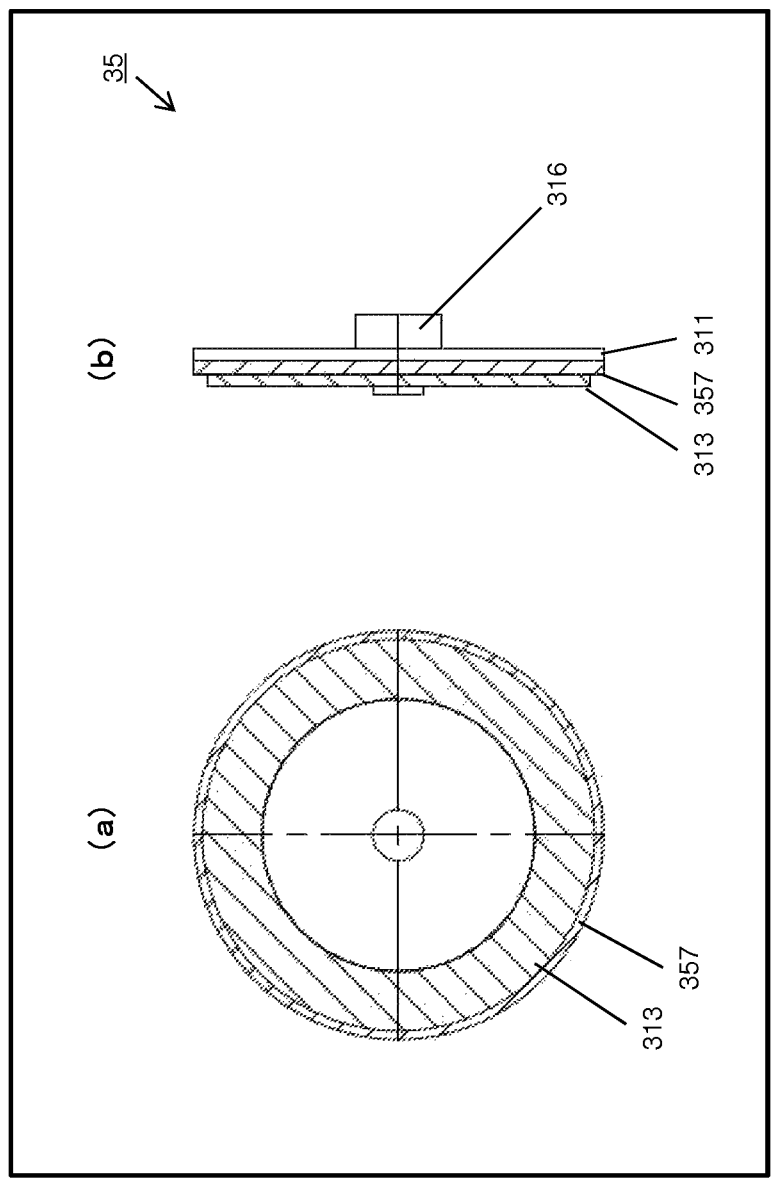
FIG. 9 illustrates a structure of a fluorescent plate 35 according to the fifth embodiment of the present invention.

FIG. 9 illustrates in detail an exemplary structure of the fluorescent plate 35, and (a) represents a front view thereof and (b) represents a side view thereof.

As shown in FIG. 8, the light source device 5 according to the fifth embodiment is different from the light source device 2 according to the second embodiment in that the light source device 5 has the first optical system 15, the second optical system 25, and the fluorescent plate 35. Due to the difference of the structures, positioning of components of the light source device 5 is different from that for the light source device 2.

Hereinafter, the structures of the light source device 5 which are different from those for the light source device 2 will be described, and description of the components denoted by the same reference numerals as in the second embodiment is not repeated.

[Structure of Fluorescent Plate 35]

The fluorescent plate 35 includes the glass substrate 311, the fluorescent material layer 313, a dielectric multilayer film 357, and the motor 316. The dielectric multilayer film 357 is a dielectric thin film that transmits blue laser light therethrough, and reflects visible light such as fluorescence. As shown in FIG. 9, on the fluorescent plate 35, the dielectric multilayer film 357 is formed on one (a first surface) of the surfaces of the glass substrate 311, and the fluorescent material layer 313 is formed in an annular shape on the dielectric multilayer film 357.

[Structure of First Optical System 15]

The first optical system 15 is different from the first optical system 12 according to the second embodiment in that the first optical system 15 does not include the diffuser plate 131 and the concave lens 132, and additionally includes a condenser lens 171. The convex lens 130 and the condenser lens 134 are positioned between the solid-state light source unit 10 and the other (a second surface) of the surfaces of the fluorescent plate 35. The condenser lens 171 and the blue light transmission dichroic minor 133 having its minor surface tilted relative to the fluorescent plate 35 by about 45 degrees are positioned closer to the first surface of the fluorescent plate 35 than to the second surface thereof. The solid-state light source unit 10, the convex lens 130, the condenser lens 134, the fluorescent plate 35, the condenser lens 171, and the blue light transmission dichroic minor 133 are positioned such that the light axes are coincident. The structures other than those described above are substantially the same as the structures of the second embodiment except that a position of the red light source 151 is different.

[Structure of Second Optical System 25]

The second optical system 25 is different from the second optical system 22 according to the second embodiment in that the second optical system 25 does not include the diffuser plate 231 and the concave lens 232, and additionally includes a condenser lens 271, similarly to the first optical system 15. The solid-state light source unit 20, the convex lens 230, the condenser lens 234, the fluorescent plate 35, the condenser lens 271, and the blue light transmission dichroic minor 233 are positioned in order, respectively, such that the light axes are coincident.

[Operation Performed by Light Source Device 5]

Blue laser light A emitted from the solid-state light source unit 10 is transmitted through the glass substrate 311 and the dielectric multilayer film 357 of the fluorescent plate 35, and spot-applied to a first region of a surface on which the fluorescent material layer 313 of the fluorescent plate 35 is formed (the +X direction shown in FIG. 8). Further, blue laser light B emitted from the solid-state light source unit 20 is transmitted through the glass substrate 311 and the dielectric multilayer film 357 of the fluorescent plate 35, and spot-applied to a second region of the surface on which the fluorescent material layer 313 of the fluorescent plate 35 is formed (the +X direction shown in FIG. 8).

The dielectric multilayer film 357 that reflects fluorescence is formed between the fluorescent material layer 313 and the glass substrate 311. Therefore, green fluorescence A generated in the fluorescent material layer 313 by excitation with the use of the blue laser light A is collected on the condenser lens 171 side (the +X direction shown in FIG. 8), and emitted. Green fluorescence B generated in the fluorescent material layer 313 by excitation with the use of the blue laser light B is collected on the condenser lens 271 side (the +X direction shown in FIG. 8), and emitted.

The green fluorescence A emitted from the fluorescent plate 35 is converted into parallel rays by the condenser lens 171, reflected by the blue light transmission dichroic minor 133, and optically guided to the light combining section 41 through the light path described in the second embodiment. On the other hand, the green fluorescence B emitted from the fluorescent plate 35 is converted into parallel rays by the condenser lens 271, reflected by the blue light transmission dichroic mirror 233, and optically guided to the light combining section 41 through the light path described in the second embodiment.

As described above, in the light source device 5 according to the fifth embodiment of the present invention, the two optical systems laid out so as to be parallel to the fluorescent plate 35 are optically combined with each other by using one fluorescent plate 35 on which the fluorescent material layer having the dielectric multilayer film is formed on one surface thereof. Thus, the green fluorescence, the red LED light, and the blue LED light which are generated in the two optical systems, can be collected and combined with each other with an enhanced efficiency.

In particular, since two optical systems are laid out in a transmissive manner so as to be opposed to one of the surfaces of the fluorescent plate 35, the light source device 5 of the fifth embodiment is advantageous in the following points. That is, the excitation light can be separately applied to the fluorescent plate 35, to minimize increase in temperature of the fluorescent material due to the excitation light, a light intensity can be uniform between the two optical systems, non-uniformity in brightness and color of the combined light can be easily reduced, and the dimension of the light source device 5 in the X-direction can be reduced.

Sixth Embodiment

Figure 10:
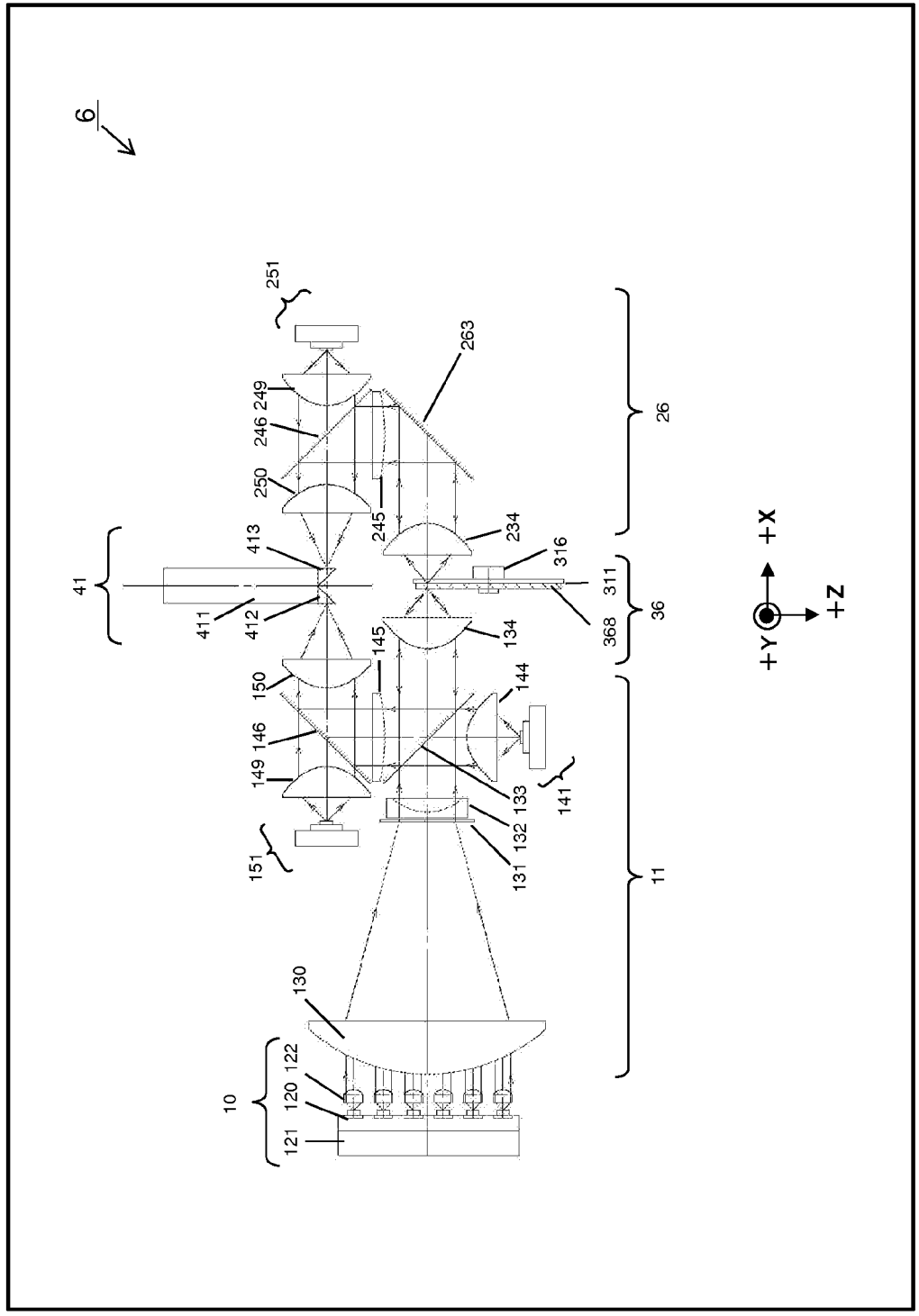
FIG. 10 illustrates a structure of a light source device 6 according to a sixth embodiment of the present invention.

FIG. 10 illustrates a structure of a light source device 6 according to a sixth embodiment of the present invention. The light source device 6, shown in FIG. 10, according to the sixth embodiment includes the solid-state light source unit 10, the first optical system 11, a second optical system 26, a fluorescent plate 36, and the light combining section 41.

Figure 11:
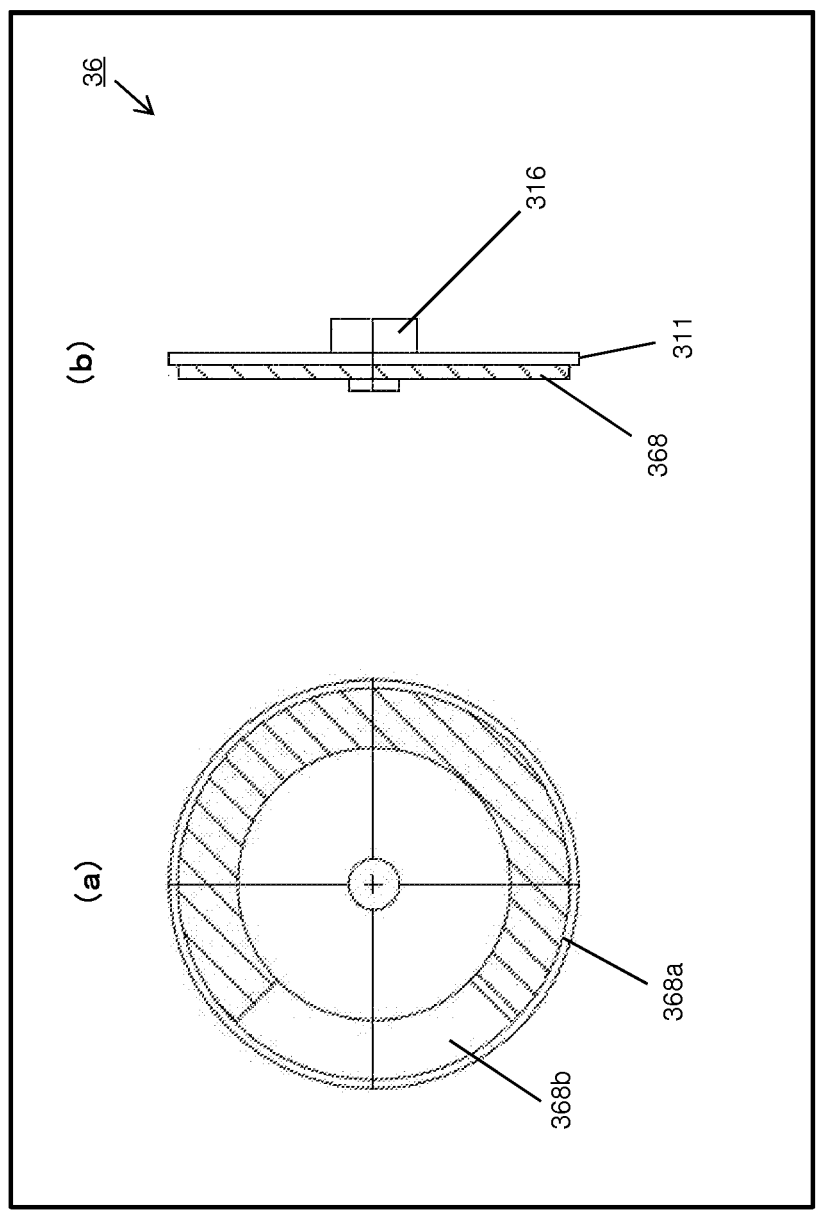
FIG. 11 illustrates a structure of a fluorescent plate 36 according to the sixth embodiment of the present invention.

FIG. 11 illustrates in detail an exemplary structure of the fluorescent plate 36, and (a) represents a front view thereof and (b) represents a side view thereof.

As shown in FIG. 10, the light source device 6 according to the sixth embodiment is different from the light source device 3 according to the third embodiment in that the light source device 6 includes the second optical system 26 and the fluorescent plate 36. Positioning of components of the light source device 6 is the same as that for the light source device 3.

Hereinafter, the structures of the light source device 6 different from those of the light source device 3 will be described, and description of the components denoted by the same reference numerals as in the third embodiment is not repeated.

[Structure of Fluorescent Plate 36]

The fluorescent plate 36 includes the glass substrate 311, a segment layer 368, and the motor 316. As shown in FIG. 11, the fluorescent plate 36 has the segment layer 368 formed in an annular shape on one (a first surface) of surfaces of the glass substrate 311, and the segment layer 368 is separated into two regions. In one of the two regions of the segment layer 368, a fluorescent material layer 368a containing a fluorescent material for emitting green fluorescence generated by excitation with the use of blue excitation light, is formed. In the other of the two regions, a diffuser layer 368b that is structured to transmit and diffuse blue laser light, is formed.

[Structure of Second Optical System 26]

The second optical system 26 shown in FIG. 10 is different from the second optical system 23 according to the third embodiment in that the second optical system 26 does not include the blue light source 241 and the condenser lens 244. Therefore, the second optical system 26 includes neither a light source for emitting blue LED light nor a light source used for generating green fluorescence by excitation. Further, the blue light transmission dichroic mirror 233 is replaced with a total reflection mirror 263.

[Operation Performed by Light Source Device 6]

Blue laser light emitted from the solid-state light source unit 10 is transmitted through the blue light transmission dichroic mirror 133, and spot-applied to a surface on which the segment layer 368 of the fluorescent plate 36 is formed (the +X direction shown in FIG. 10). The fluorescent plate 36 is controlled so as to rotate by the motor 316. Therefore, while the blue laser light is applied to the fluorescent material layer 368a, green fluorescence is generated by excitation on both sides of the fluorescent plate 36 in the +X direction and the −X direction shown in FIG. 10. On the other hand, while the blue laser light is applied to the diffuser layer 368b, the blue laser light is transmitted through the fluorescent plate 36, and diffused, and emitted toward the condenser lens 234 (the +X direction shown in FIG. 10).

The green fluorescence emitted in the −X direction from the fluorescent plate 36 is optically guided to the light combining section 41 through the light path described in the third embodiment. On the other hand, the green fluorescence and the blue laser light emitted in the +X direction from the fluorescent plate 36 are converted into almost parallel rays by the condenser lens 234, reflected by the total reflection minor 263, and optically guided to the light combining section 41 through the light path described in the third embodiment.

As described above, in the light source device 6 according to the sixth embodiment of the present invention, the two optical systems laid out so as to be bilaterally symmetric about the fluorescent plate 36 are optically combined with each other by using one fluorescent plate 36 having a segment layer formed thereon. Thus, the green fluorescence, the red LED light, and the blue LED light which are generated in the two optical systems can be collected and combined with each other with an enhanced efficiency. Further, since the fluorescent plate 36 having no reflective film is used, one of the optical systems need not have a semiconductor laser light source used for generating green fluorescence by excitation.

In particular, since the two optical systems are laid out bilaterally to the fluorescent plate 36 having a region through which blue laser light is transmitted, the light source device 6 is advantageous in that the blue light source can be integrated into one and the dimension of the light source device 6 in the Y direction can be reduced.

<Example 1 of Projection Display Apparatus Using Light Source Device>

Figure 12:
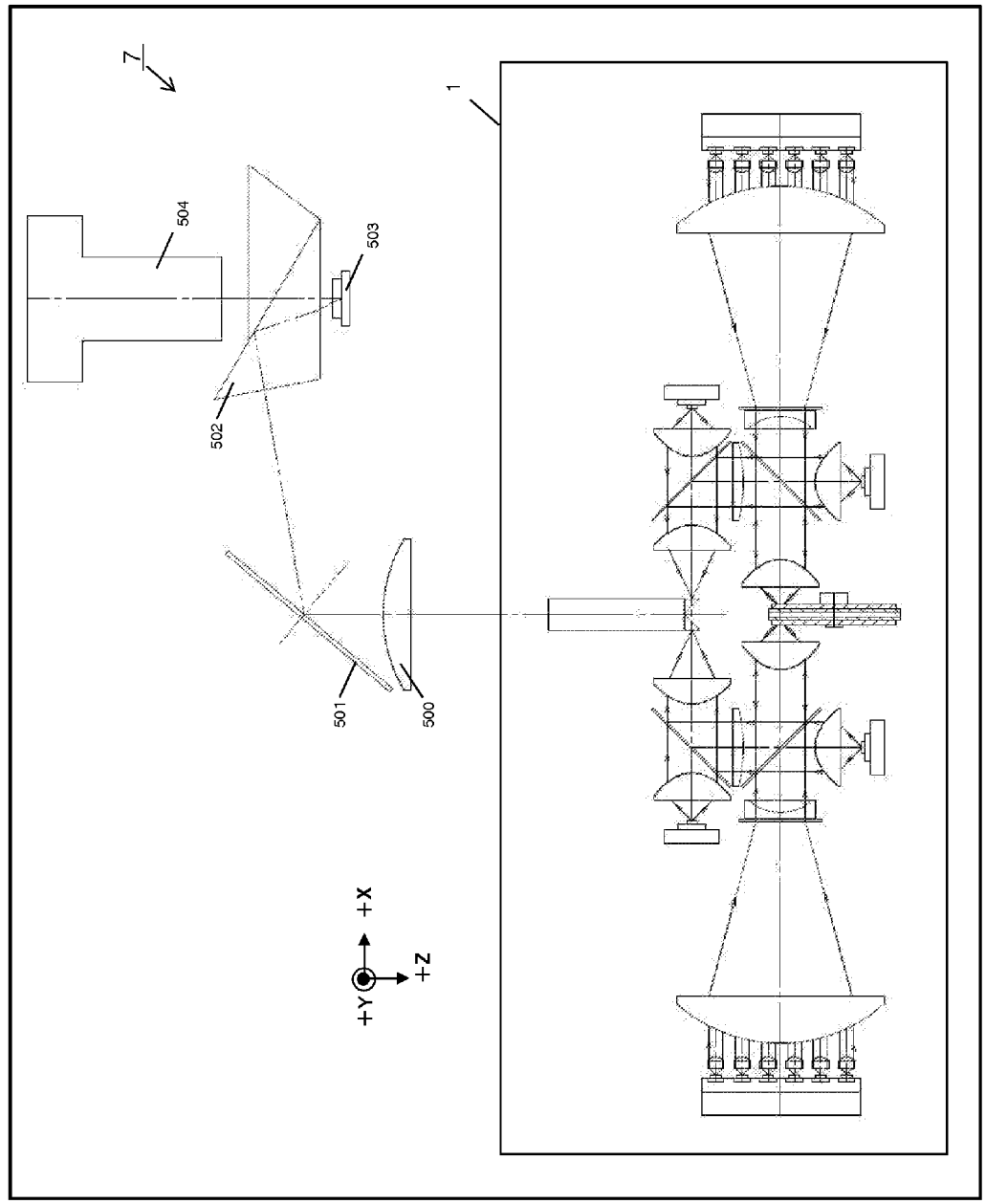
FIG. 12 illustrates a structure of a projection display apparatus 7 using the light source device of the present invention.

FIG. 12 illustrates an exemplary structure of a projection display apparatus 7 using the light source device of the present invention. The projection display apparatus 7 shown in FIG. 12 includes the light source device 1 according to the first embodiment, a relay lens 500, a total reflection mirror 501, a total reflection prism 502, a DMD 503, and a projection lens 504.

In the light source device 1, two solid-state light source units, that is, the solid-state light source units 10 and 20, two blue light sources, that is, the blue light sources 141 and 241, and two red light sources, that is, the red light sources 151 and 251 are lit up in synchronization with each other, and chronologically emit colored light, that is, green light, red light, and blue light.

The rod integrator 411 is formed of a quadrangular-prism-shaped glass and has rectangular light incident surface and light exit surface. Light incident on the light incident surface of the rod integrator 411 is subjected to multiple reflection including total reflection, and propagates to the light exit surface. In this propagation, light that is non-uniform on the light incident surface become uniform on the light exit surface. Light emitted from the rod integrator 411 is refracted and reflected by the relay lens 500, the total reflection minor 501, and the total reflection prism 502, and is incident on the DMD 503. A focus of the relay lens 500 is determined such that the light exit surface of the rod integrator 411 and a surface of the DMD 503 cooperate with each other. The total reflection prism 502 is a prism that totally reflects illumination light, and transmits projected light from the DMD 503 therethrough. Light emitted from the rod integrator 411 becomes illumination light representing a rectangular shape homothetic to a display region, on the DMD 503, and uniformly illuminates the surface of the DMD 503 with an enhanced efficiency. Light incident on the DMD 503 is transmitted such that only light necessary for forming an image is deflected according to a video signal, is transmitted through the total reflection prism 502, and is incident on the projection lens 504. The projection lens 504 enables image light formed by modulation in the DMD 503 to be enlarged and projected.

As described above, the light source device 1 of the present invention and a light valve including one minor-deflection type DMD using a time division system are used, so that the projection display apparatus 7 that has a small size and a light weight, and enables a high brightness to be obtained, can be structured.

<Example 2 of Projection Display Apparatus Using Light Source Device>

Figure 13:
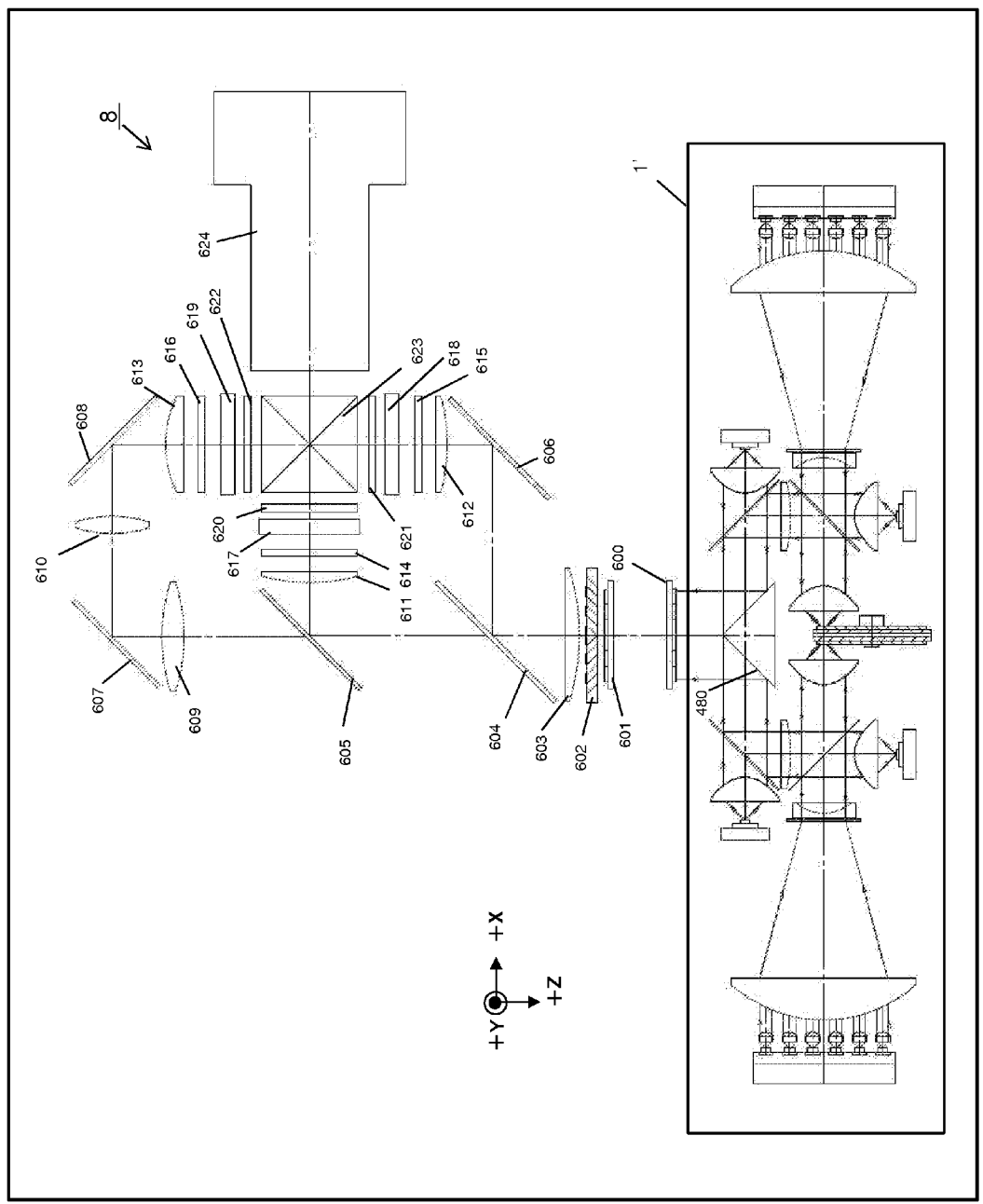
FIG. 13 illustrates a structure of a projection display apparatus 8 using the light source device of the present invention.

FIG. 13 illustrates an exemplary structure of a projection display apparatus 8 using the light source device of the present invention. The projection display apparatus 8 shown in FIG. 13 includes: a light source device 1' that is a modification of the light source device 1 according to the first embodiment; lens array plates 600 to 601; a polarization converting device 602; a superimposing lens 603; a blue light reflection dichroic mirror 604; a green light reflection dichroic mirror 605; reflective mirrors 606 to 608; relay lenses 609 to 610; field lenses 611 to 613; light incident side polarizers 614 to 616; liquid crystal panels 617 to 619; light exit side polarizers 620 to 622; a combining prism 623 including a dichroic minor for reflecting red light and a dichroic minor for reflecting blue light; and a projection lens 624.

The light source device 1' is different from the light source device 1 in that the light source device 1' does not include the condenser lenses 150 and 250, and includes a combining prism 480 instead of the light combining section 41. White light (the size is almost the same among the light fluxes for each color, and the center of gravity is the same among the light fluxes for each color) outputted from each of the red light transmission dichroic minors 146 and 246 is combined with each other in the combining prism 480 having sloped surfaces that are subjected to reflective coating.

The white light obtained by the combination in the combining prism 480 is separated into multiple light fluxes by the lens array plate 600, and converged on the lens array plate 601. The lens array plates 600 and 601 each include a plurality of lens elements. The lens elements of the lens array plate 600 have an open shape that is homothetic to a shape of each of the liquid crystal panels 617 to 619. The lens elements of the lens array plate 601 have its focal length determined such that the lens array plate 600 and the liquid crystal panels 617 to 619 almost cooperate with each other. Light emitted from the lens array plate 601 is converted into light directed in one polarization direction by the polarization converting device 602 including a polarization separation prism and a half-wavelength plate. The light having its polarization direction converted is transmitted through the superimposing lens 603, and separated into blue-colored light, green-colored light, and red-colored light by the blue light reflection dichroic mirror 604 and the green light reflection dichroic mirror 605. The superimposing lens 603 is a lens for superimposing and illuminating light emitted from each of the lens elements of the lens array plate 601 on the liquid crystal panels 617 to 619.

The green light is transmitted through the field lens 611 and the light incident side polarizer 614, and is incident on the liquid crystal panel 617. The blue light is reflected by the reflective mirror 606, is transmitted through the field lens 612 and the light incident side polarizer 615, and is incident on the liquid crystal panel 618. The red light is transmitted through, or refracted and reflected by the relay lens 609 to 610 and the reflective minors 607 to 608, is transmitted through the field lens 613 and the light incident side polarizer 616, and is incident on the liquid crystal panel 619.

Three liquid crystal panels, that is, the liquid crystal panels 617 to 619 acting as light valves are transmission-type active matrix liquid crystal panels each of which uses a TN mode or a VA mode, and has a thin film transistor formed in pixel regions, and changes a polarized state of incident light by a voltage applied to pixels being controlled according to a video signal. The liquid crystal panels 617 to 619 modulate light by combined operation of the light incident side polarizers 614 to 616 and the light exit side polarizers 620 to 622 which are positioned bilaterally to the liquid crystal panels 617 to 619 such that transmission axes are orthogonal to the liquid crystal panels 617 to 619, respectively, thereby forming a green, a blue, and a red images. Colored light is transmitted through the light exit side polarizers 620 to 622, and red light, blue light, and green light reflected by the respective dichroic minors are combined with each other by the combining prism 623, and enlarged and projected through the projection lens 624 on a screen (not shown).

As described above, the projection display apparatus 8 can be structured to enable favorable color reproduction to be realized without color breaking, and enable reduction in size and weight, and enhancement of brightness and accuracy to be realized, by using the light source device 1' of the present invention, and a light valve formed of three liquid crystal panels using a polarization system instead of a time division system.

In the embodiment described above, the transmission-type liquid crystal panel is used as a light valve. However, a reflection-type liquid crystal panel may be used. The use of the reflection-type liquid crystal panel enables a projection display apparatus to have its size further reduced and its accuracy further enhanced. Further, three mirror-deflection type light valves may be used as the light valve.

While the invention has been described in detail, the foregoing description is in all aspects illustrative and not restrictive. It will be understood that numerous other modifications and variations can be devised without departing from the scope of the invention.

What is claimed is:

1. A light source device utilizing excitation light to emit fluorescence, the light source device comprising:
   an excitation light source for emitting the excitation light;
   a fluorescent plate in which a substrate has a surface to which a fluorescent material is applied;
   a first optical system configured to optically guide, to a light combining section, fluorescence emitted in a first direction by the excitation light being applied to the fluorescent material; and
   a second optical system configured to optically guide, to the light combining section, fluorescence emitted in a second direction by the excitation light being applied to the fluorescent material; wherein
   the excitation light source includes a first light source and a second light source;
   the first direction in which the fluorescence is emitted by the first optical system is a direction in which light is reflected as the fluorescence by the excitation light emitted from the first light source being incident, and
   the second direction in which the fluorescence is emitted by the second optical system is a direction in which light is reflected as the fluorescence by the excitation light emitted from the second light source being incident.

2. The light source device according to claim 1, wherein the fluorescent plate includes:
   the substrate;
   a reflective film formed on both surfaces of the substrate; and
   the fluorescent material applied to the reflective film, and
   the first light source and the second light source apply the excitation light to the fluorescent material on different surfaces, respectively, of the fluorescent plate.

3. The light source device according to claim 2, wherein an axis of the fluorescence in the first direction and an axis of the fluorescence in the second direction are coincident, and
   the first optical system and the second optical system are positioned so as to be almost symmetric about the fluorescent plate.

4. The light source device according to claim 2, wherein a position at which the excitation light is applied to the fluorescent material for emitting the fluorescence in the first direction is different from a position at which the excitation light is applied to the fluorescent material for emitting the fluorescence in the second direction, and an axis of the fluorescence in the first direction and an axis of the fluorescence in the second direction do not coincide.

5. The light source device according to claim 1, wherein the fluorescent plate includes:
   the substrate;
   a reflective film formed on one surface of the substrate; and
   the fluorescent material applied to the reflective film, and
   the first light source and the second light source each apply the excitation light to the fluorescent plate on a same single surface of the fluorescent plate.

6. The light source device according to claim 5, wherein the first direction and the second direction are parallel to each other, and
   the first optical system and the second optical system are positioned so as to be almost symmetric about the fluorescent plate.

7. The light source device according to claim 1, wherein the fluorescent plate includes:
a transparent substrate; and
the fluorescent material applied to one surface of the transparent substrate, and
the first light source and the second light source apply the excitation light to the fluorescent material on different surfaces, respectively, of the fluorescent plate.

8. The light source device according to claim 7, wherein
an axis of the fluorescence in the first direction and an axis of the fluorescence in the second direction are coincident, and
the first optical system and the second optical system are positioned so as to be almost symmetric about the fluorescent plate.

9. A light source device utilizing excitation light to emit fluorescence, the light source device comprising:
an excitation light source for emitting the excitation light;
a fluorescent plate in which a substrate has a surface to which a fluorescent material is applied;
a first optical system configured to optically guide, to a light combining section, fluorescence emitted in a first direction by the excitation light being applied to the fluorescent material; and
a second optical system configured to optically guide, to the light combining section, fluorescence emitted in a second direction by the excitation light being applied to the fluorescent material; wherein
the first direction in which the fluorescence is emitted by the first optical system is a direction in which light is reflected as the fluorescence by the excitation light emitted from the excitation light source being incident, and
the second direction in which the fluorescence is emitted by the second optical system is a direction in which the excitation light that is emitted from the excitation light source and is incident is transmitted.

10. The light source device according to claim 9, wherein the fluorescent plate includes:
a transparent substrate; and
the fluorescent material applied to at least a portion of one surface of the transparent substrate, and
the excitation light source applies the excitation light to one surface of the fluorescent plate.

11. The light source device according to claim 10, wherein the first optical system and the second optical system are positioned so as to be almost symmetric about the fluorescent plate.

12. A light source device utilizing excitation light to emit fluorescence, the light source device comprising:
an excitation light source for emitting the excitation light;
a fluorescent plate in which a substrate has a surface to which a fluorescent material is applied;
a first optical system configured to optically guide, to a light combining section, fluorescence emitted in a first direction by the excitation light being applied to the fluorescent material; and
a second optical system configured to optically guide, to the light combining section, fluorescence emitted in a second direction by the excitation light being applied to the fluorescent material; wherein
the excitation light source includes a first light source and a second light source,
the first direction in which the fluorescence is emitted by the first optical system is a direction in which the excitation light that is emitted from the first light source and is incident is transmitted, and
the second direction in which the fluorescence is emitted by the second optical system is a direction in which the excitation light that is emitted from the second light source and is incident is transmitted.

13. The light source device according to claim 12, wherein
the first direction and the second direction are parallel to each other, and
the first optical system and the second optical system are positioned so as to be almost symmetric about the fluorescent plate.

14. The light source device according to claim 1, wherein
an optical distance of the first optical system and an optical distance of the second optical system are almost equal to each other.

15. The light source device according to claim 1, wherein the excitation light source includes a plurality of semiconductor lasers.

16. The light source device according to claim 1, wherein the fluorescence emitted from the fluorescent material in the first direction and the fluorescence emitted from the fluorescent material in the second direction have almost the same fluorescence spectrum.

17. The light source device according to claim 1, wherein each of the first optical system and the second optical system includes at least one additional light source that emits colored light in a wavelength band that is different from a main wavelength band of the fluorescence emitted from the fluorescent material.

18. The light source device according to claim 17, wherein a light intensity of the fluorescence emitted from the fluorescent plate and a light intensity of the colored light emitted from the at least one additional light source are equal to each other.

19. The light source device according to claim 17, wherein the colored light of the at least one additional light source is combined with the fluorescence emitted from the fluorescent plate to generate white light.

20. A projection display apparatus comprising:
the light source device according to claim 1;
an image display device, on which light outputted from the light source device is incident, configured to modulate the incident light according to a video signal; and
a projection lens configured to project, on a screen, light obtained by the modulation in the image display device.

* * * * *